US012008761B2

(12) United States Patent
Su et al.

(10) Patent No.: US 12,008,761 B2
(45) Date of Patent: Jun. 11, 2024

(54) IMAGE PROCESSING METHOD AND APPARATUS, AND DEVICE

(71) Applicant: Huawei Technologies Co., Ltd., Shenzhen (CN)

(72) Inventors: Da Su, Shenzhen (CN); Yundie Zhang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 407 days.

(21) Appl. No.: 17/609,948

(22) PCT Filed: Apr. 28, 2020

(86) PCT No.: PCT/CN2020/087529
§ 371 (c)(1),
(2) Date: Nov. 9, 2021

(87) PCT Pub. No.: WO2020/224488
PCT Pub. Date: Nov. 12, 2020

(65) Prior Publication Data
US 2022/0245823 A1 Aug. 4, 2022

(30) Foreign Application Priority Data
May 9, 2019 (CN) .......................... 201910386382.9

(51) Int. Cl.
*G06K 9/00* (2022.01)
*G06F 3/04845* (2022.01)
(Continued)

(52) U.S. Cl.
CPC ............ *G06T 7/11* (2017.01); *G06F 3/04845* (2013.01); *G06T 7/13* (2017.01); *G06V 10/462* (2022.01); *G06T 2207/20132* (2013.01)

(58) Field of Classification Search
CPC ......... G06T 2207/20081; G06T 11/001; G06T 11/60; G06T 2207/10024;
(Continued)

(56) References Cited

U.S. PATENT DOCUMENTS 10,262,229 B1   4/2019  Rao et al.
2015/0110348 A1 4/2015  Solanki et al.
(Continued)

FOREIGN PATENT DOCUMENTS

CN    104063444 A    9/2014
CN    104484854 A    4/2015
(Continued)

OTHER PUBLICATIONS

Song-Hai Zhang, Xin Dong, Hui Li, Ruilong Li, Yong-Liang Yang, PortraitNet: Real-time portrait segmentation network for mobile device, Science Direct, Computers & Graphics, vol. 80, 2019 (Year: 2019).*
(Continued)

*Primary Examiner* — Alex Kok S Liew
(74) *Attorney, Agent, or Firm* — Conley Rose, P.C.

(57) ABSTRACT

An image processing method includes displaying a first image, where the first image has a first size. The method further includes receiving an operation of a user, where the operation of the user is any one of the following operations: a profile picture setting operation, a screen setting operation, a picture sharing operation, a contact list operation, or a picture sending operation. The method further includes displaying a second image, where the second image has a second size, the second size is less than the first size, and the second image includes salient content on the first image.

21 Claims, 22 Drawing Sheets

(51) Int. Cl.
*G06T 7/11* (2017.01)
*G06T 7/13* (2017.01)
*G06V 10/46* (2022.01)

(58) Field of Classification Search
CPC ... G06T 2207/20084; G06T 5/10; G06T 5/50; G06T 7/00; G06T 7/194; G06T 2200/24; G06T 2207/10048; G06T 2207/10064; G06T 2207/10101; G06T 2207/10152; G06T 2207/20101; G06T 2207/20224; G06T 2207/30041; G06T 2207/30168; G06T 7/0012; G06T 7/0014; G06T 7/10; G06T 7/571; G06T 7/73; G06T 9/00
See application file for complete search history.

(56) References Cited

U.S. PATENT DOCUMENTS

| | | | |
|---|---|---|---|
| 2016/0085266 A1* | 3/2016 | Lee | G06F 3/017 348/240.2 |
| 2016/0196660 A1 | 7/2016 | Prevrhal et al. | |
| 2016/0196662 A1* | 7/2016 | Zhao | G06V 40/162 345/419 |
| 2019/0139227 A1 | 5/2019 | Wang et al. | |

FOREIGN PATENT DOCUMENTS

| | | |
|---|---|---|
| CN | 105279755 A | 1/2016 |
| CN | 105474264 A | 4/2016 |
| CN | 107622504 A | 1/2018 |
| CN | 108492246 A | 9/2018 |
| CN | 108510574 A | 9/2018 |
| CN | 108776970 A | 11/2018 |
| CN | 108876791 A | 11/2018 |
| CN | 108921859 A | 11/2018 |
| CN | 109146892 A | 1/2019 |
| CN | 109215032 A | 1/2019 |
| CN | 109215033 A | 1/2019 |
| CN | 109448001 A | 3/2019 |
| CN | 109461167 A | 3/2019 |
| CN | 110456960 A | 11/2019 |

OTHER PUBLICATIONS

Riad, R., Ros, F., hajji, M.E. et al. An industrial portrait background removal solution based on knowledge infusion. Appl Intell 52, 11592-11605, 2022 (Year: 2022).*

Ting, W., et al., "Saliency region detection method based on stereo vision analysis," School of Computer and Information, Hefei University of Technology, Journal of Electronic Measurement and Instrumentation, vol. 29 No. 3, Mar. 2015, 9 pages.

* cited by examiner

FIG. 2

— — — Rectangular region

———— Square region

IMAGE PROCESSING METHOD AND APPARATUS, AND DEVICE

CROSS-REFERENCE TO RELATED APPLICATIONS

This application is a National Stage of International Patent Application No. PCT/CN2020/087529 filed on Apr. 28, 2020, which claims priority to Chinese Patent Application No. 201910386382.9 filed on May 9, 2019, both of which are hereby incorporated by reference in their entireties.

TECHNICAL FIELD

This application relates to the field of computer technologies, and in particular, to an image processing method and apparatus, and a device.

BACKGROUND

Currently, in many application scenarios (for example, profile picture setting of a contact and desktop setting of a smartwatch), an original image needs to be cropped to obtain a cropped image, and the cropped image needs to be used.

In the conventional technology, image cropping is usually performed at a middle location of an original image to obtain a cropped image. However, the image obtained by cropping at the middle location of the original image may not include a salient object (an object in which a user is more interested) in the original image, resulting in poor image cropping quality.

SUMMARY

This application provides an image processing method and apparatus, and a device, to improve image cropping quality.

According to a first aspect, an embodiment of this application provides an image processing method. The method may include: displaying a first image having a first size; receiving an operation of a user, where the operation of the user is any one of the following operations: a profile picture setting operation, a screen setting operation, a picture sharing operation, a contact list operation, and a picture sending operation; and displaying a second image having a second size, where the second size is less than the first size, and the second image includes salient content on the first image.

In the foregoing process, after a terminal device displays the first image, the user may input an operation into the terminal device, so that the terminal device displays the second image in the first image. The second image is a part of the first image and the second image includes the salient content in the first image. The image cropping quality is improved.

In a possible implementation, before the second image is displayed, a salient object and a second circular region including the salient object may be further determined in the first image, where a second diameter of the second circular region is greater than a first diameter of a first circular region, the second diameter is less than or equal to a shortest side length of the first image, and the first circular region is a smallest circular region including the salient object; and the first image is cropped based on the second circular region to obtain the second image.

In the foregoing process, the salient object is first obtained in the to-be-processed first image, and cropping processing is performed on the first image based on a location of the salient object in the first image to obtain the cropped second image. In this way, not only the second image can include the salient object, but also the location of the salient object in the first image can be made consistent with a location of the salient object in the second image. This can further enable an image composition of the cropped second image to be consistent with an image composition of the first image, thereby improving image cropping quality.

In a possible implementation, the second circular region including the salient object may be determined in the first image in the following feasible implementation: obtaining a first ratio of the first diameter to the shortest side length of the first image; if the first ratio is between a first threshold and a second threshold, determining the second circular region based on a preset ratio of the second diameter to the first diameter; and if the first ratio is less than the first threshold or greater than the second threshold, determining a square region in the first image, and determining an inscribed circle region of the square region as the second circular region, where the square region includes the salient object, and a side length of the square region is the shortest side length of the first image.

In the foregoing process, when the first ratio is between the first threshold and the second threshold, it indicates that a proportion of the first circular region in the first image is not excessively large or small. In this case, the second circular region may be determined based on the preset ratio of the second diameter to the first diameter (for example, the preset ratio may be 0.618), so that a size occupied by the salient object in the second circular region complies with an aesthetic image composition rule, thereby improving image cropping quality. When the first ratio is not between the first threshold and the second threshold, it indicates that the proportion of the first circular region in the first image is excessively large or small. To avoid the cropped second image from being excessively large or small, the square region is determined in the first image, and the inscribed circle region of the square region is determined as the second circular region, thereby improving image cropping quality.

In a possible implementation, the second circular region may be determined based on the preset ratio of the second diameter to the first diameter in the following feasible implementation: determining the first circular region in the first image; and determining the second circular region in the first image based on a circle center of the first circular region, a center of the first image, the first diameter, and the preset ratio.

In a possible implementation, the determining the second circular region in the first image based on a circle center of the first circular region, a center of the first image, the first diameter, and the preset ratio includes: determining an initial circle center in the first image based on the circle center of the first circular region and the center of the first image, where the circle center of the first circular region, the center of the first image, and the initial circle center are located on one straight line; determining the second diameter based on the first diameter and the preset ratio; and determining the second circular region in the first image based on the initial circle center and the second diameter.

Optionally, the determining the second circular region in the first image based on the initial circle center and the second diameter includes: determining a third circular region by using the initial circle center as a circle center and the second diameter as a diameter, where the first circular region is internally tangent to the third circular region; determining whether the third circular region has a part outside the first image; and if the third circular region has a part outside the first image, performing a translation operation and/or a rotation operation on the third circular region, and until the processed third circular region is entirely located in the first image, determining the processed third circular region in the first image as the second circular region; or if the third circular region has no part outside the first image, determining the third circular region as the second circular region.

In the foregoing process, with the foregoing method, a location of the salient object in the second circular region can be further made consistent with the location of the salient object in the first image. This can further enable the image composition of the cropped image to be consistent with the image composition of the first image, thereby improving image cropping quality.

In a possible implementation, the square region may be determined in the first image in the following feasible implementation: determining a rectangular region in the first image, where the rectangular region is a smallest rectangular region that includes the salient object; and determining the square region in the first image based on a size of the rectangular region and the side length of the square region.

In a possible implementation, the determining the square region in the first image based on a size of the rectangular region and the side length of the square region includes: determining, based on the size of the rectangular region and the side length of the square region, whether the square region is capable of totally covering the rectangular region; and if the square region is capable of totally covering the rectangular region, obtaining a location of a center of gravity of the first image in the first image and a center of gravity of the salient object, and determining the square region based on the location of the center of gravity of the first image in the first image and the center of gravity of the salient object; or if the square region is incapable of totally covering the rectangular region, determining the square region based on the rectangular region, where the square region is located in a middle location of the rectangular region.

In the foregoing process, a location of the rectangular region in the square region is determined based on the location of the center of gravity of the first image in the first image, and a location of the salient object in the square region can be made consistent with the location of the salient object in the first image. This can further enable the image composition of the cropped image to be consistent with the image composition of the first image, thereby improving image cropping quality.

In a possible implementation, the obtaining a location of a center of gravity of the first image in the first image includes: determining the center of gravity of the first image; obtaining a first distance between the center of gravity of the first image and a center of the first image, a second distance between the center of gravity of the first image and a first trisector line of the first image, and a third distance between the center of gravity of the first image and a first edge of the first image, where in a plurality of trisector lines of the first image, the distance between the center of gravity of the first image and the first trisector line is shortest, and in a plurality of edges of the first image, the distance between the center of gravity of the first image and the first edge is shortest; and determining the location of the center of gravity of the first image in the first image based on the first distance, the second distance, and the third distance, where the location of the center of gravity of the first image in the first image is at least one of the following locations: a location near the center, a location near a trisector line, or a location near an edge.

In a possible implementation, the determining the location of the center of gravity of the first image in the first image based on the first distance, the second distance, and the third distance includes: if the first distance is less than the second distance and the third distance, determining that the location of the center of gravity of the first image in the first image is the location near the center; or if the second distance is less than the first distance and the third distance, determining that the location of the center of gravity of the first image in the first image is the location near a trisector line; or if the third distance is less than the first distance and the second distance, determining that the location of the center of gravity of the first image in the first image is the location near an edge. In this way, the location of the salient object in the square region can be made consistent with the location of the salient object in the first image. This can further enable the image composition of the cropped image to be consistent with the image composition of the first image, thereby improving image cropping quality.

In a possible implementation, the determining the square region based on the location of the center of gravity of the first image in the first image and the center of gravity of the salient object includes: if the location of the center of gravity of the first image in the first image is the location near the center, determining the square region based on the center of gravity of the salient object and a center of the square region, where the center of gravity of the salient object is located at a central location of the square region; or if the location of the center of gravity of the first image in the first image is the location near a trisector line, determining the square region based on the center of gravity of the salient object and a second trisector line of the square region, where the center of gravity of the salient object is located on the second trisector line, the first trisector line and the second trisector line have a same type, and types of trisector lines include an upper trisector line, a lower trisector line, a left trisector line, and a right trisector line; or if the location of the center of gravity of the first image in the first image is the location near an edge, determining the square region based on the center of gravity of the salient object and a second edge of the square region, where a distance between the center of gravity of the salient object and the second edge is less than a preset distance, the second edge and the first edge have a same type, and types of edges include an upper edge, a lower edge, a left edge, and a right edge. In this way, the location of the salient object in the square region can be made consistent with the location of the salient object in the first image. This can further enable the image composition of the cropped image to be consistent with the image composition of the first image, thereby improving image cropping quality.

In a possible implementation, the determining a salient object in the first image includes: performing at least one of saliency detection processing, semantic segmentation processing, and line detection processing on the first image to determine the salient object in the first image.

According to a second aspect, an embodiment of this application provides an image processing apparatus, including a memory and a processor. The processor executes program instructions in the memory to implement the image processing method according to any implementation of the first aspect.

According to a third aspect, an embodiment of this application provides a storage medium. The storage medium is configured to store a computer program, and when executed by a computer or a processor, the computer program is configured to implement the image processing method according to any implementation of the first aspect.

According to a fourth aspect, an embodiment of this application provides a computer program product. The computer program product includes instructions, and when the instructions are executed, a computer is enabled to perform the image processing method according to any implementation of the first aspect.

According to a fifth aspect, an embodiment of this application provides a system on chip or a system chip. The system on chip or the system chip may be applied to a terminal device, and the system on chip or the system chip includes at least one communications interface, at least one processor, and at least one memory. The communications interface, the memory, and the processor are interconnected by using a bus, and the processor executes instructions stored in the memory, so that the terminal device can perform the image processing method according to any implementation of the first aspect of this application.

According to the image processing method and apparatus and the device, after the terminal device displays the first image, the user may input an operation into the terminal device, so that the terminal device displays the second image in the first image. The second image is a part of the first image and the second image includes the salient content in the first image. The image cropping quality is improved.

BRIEF DESCRIPTION OF DRAWINGS

FIG. 2 is a schematic diagram of trisector lines according to an embodiment application;

DESCRIPTION OF EMBODIMENTS

To facilitate understanding of this application, concepts in this application are first described.

A terminal device may be any device with an image processing and computing capability. The terminal device may further have an image display function. For example, the terminal device may be a mobile phone, a computer, a vehicle-mounted device, a wearable device, an industrial device, an artificial intelligence device/augmented reality (augmented reality, AR) device, or a virtual reality (virtual reality, VR) device.

A terminal function refers to a function provided by a terminal device or a function implementable by the terminal device. The terminal function includes at least a function provided by the terminal device itself and a function provided by an application installed in the terminal device. A function provided by a terminal device in this application may be a function provided by the terminal device when the terminal device is delivered from a factory. For example, the terminal function may include a profile picture setting function, a screen setting function, a picture sharing function, a contact list function, a picture sending function, or an image processing function.

Figure 1A:
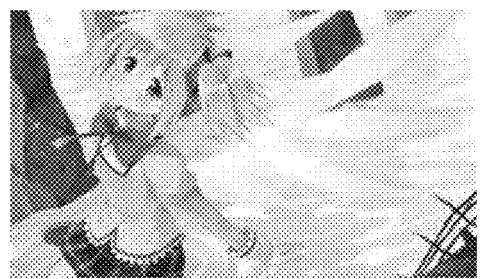
FIG. 1A is a schematic diagram of an image according to an embodiment of this application.
Figure 1B:
FIG. 1B is a schematic diagram of another image according to an embodiment of this application.

A salient object refers to a relatively prominent object included in an image, that is, when a user observes an image, attention (or a point of interest) of the user is drawn to the salient object. For example, a salient object in an image may be a person, an animal, a building, food, or the like. The following describes the salient object with reference to FIG. 1A and FIG. 1B. FIG. 1A is a schematic diagram of an image according to an embodiment of this application. FIG. 1B is a schematic diagram of another image according to an embodiment of this application. Referring to FIG. 1A, a salient object in the image is a cartoon character. That is, when a user observes the image, the user's attention is drawn to the cartoon character. Referring to FIG. 1B, a salient object in the image is an animal. That is, when a user observes the image, the user's attention is drawn to the animal.

Figure 2:
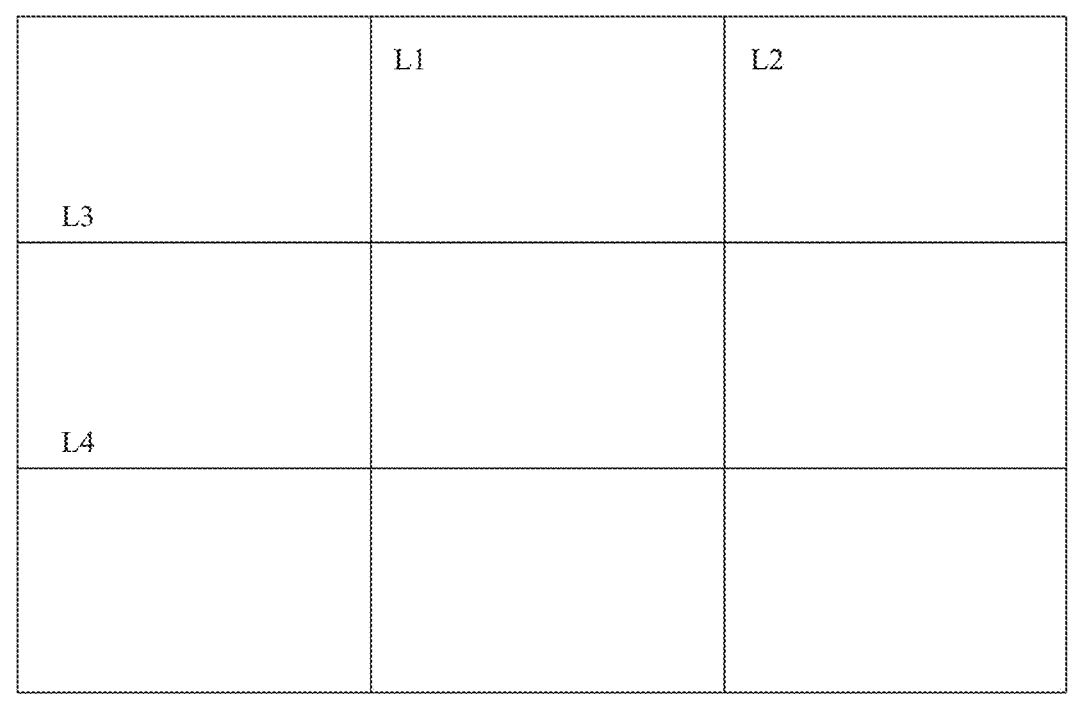

Trisector lines of an image include an upper trisector line, a lower trisector line, a left trisector line, and a right trisector line. The following describes trisector lines of an image with reference to FIG. 2. FIG. 2 is a schematic diagram of trisector lines according to an embodiment of this application. Referring to FIG. 2, the image may be evenly divided into three parts by a straight line L3 and a straight line L4 in a vertical direction. L3 is an upper trisector line of the image, and L4 is a lower trisector line of the image. Referring to FIG. 1C, the image may be evenly divided into three parts by a straight line L1 and a straight line L2 in a horizontal direction. L1 is a left trisector line of the image, and L2 is a right trisector line of the image.

A center of gravity of an image is used to indicate an average location of grayscale value distribution of pixels. The center of gravity of an image is similar to a physical center of mass. The center of gravity of an image may be calculated k using the following formula:

$$X_c = \frac{\sum P_i x_i}{\sum P_i}$$

$$Y_c = \frac{\sum P_i y_i}{\sum P_i}$$

$X_c$ is a coordinate of the center of gravity in a horizontal direction, $Y_c$ is a coordinate of the center of gravity in a vertical direction, $P_i$ is a grayscale value of an $i^{th}$ pixel, $x_i$ is a coordinate of the $i^{th}$ pixel in the horizontal direction, and $y_i$ is a coordinate of the $i^{th}$ pixel in the vertical direction.

An image composition may also be referred to as a structure of an image, and may include a location of the image's salient object in the image. For example, a location of a salient object in an image may include a location near a trisector line (including a location near an upper trisector line, a location near a lower trisector line, a location near a left trisector line, and a location near a right trisector line), a location near a center, or a location near an edge.

For ease of understanding, the following describes applicable application scenarios of this application by using an example in which a terminal device is a mobile phone.

Figure 3A:
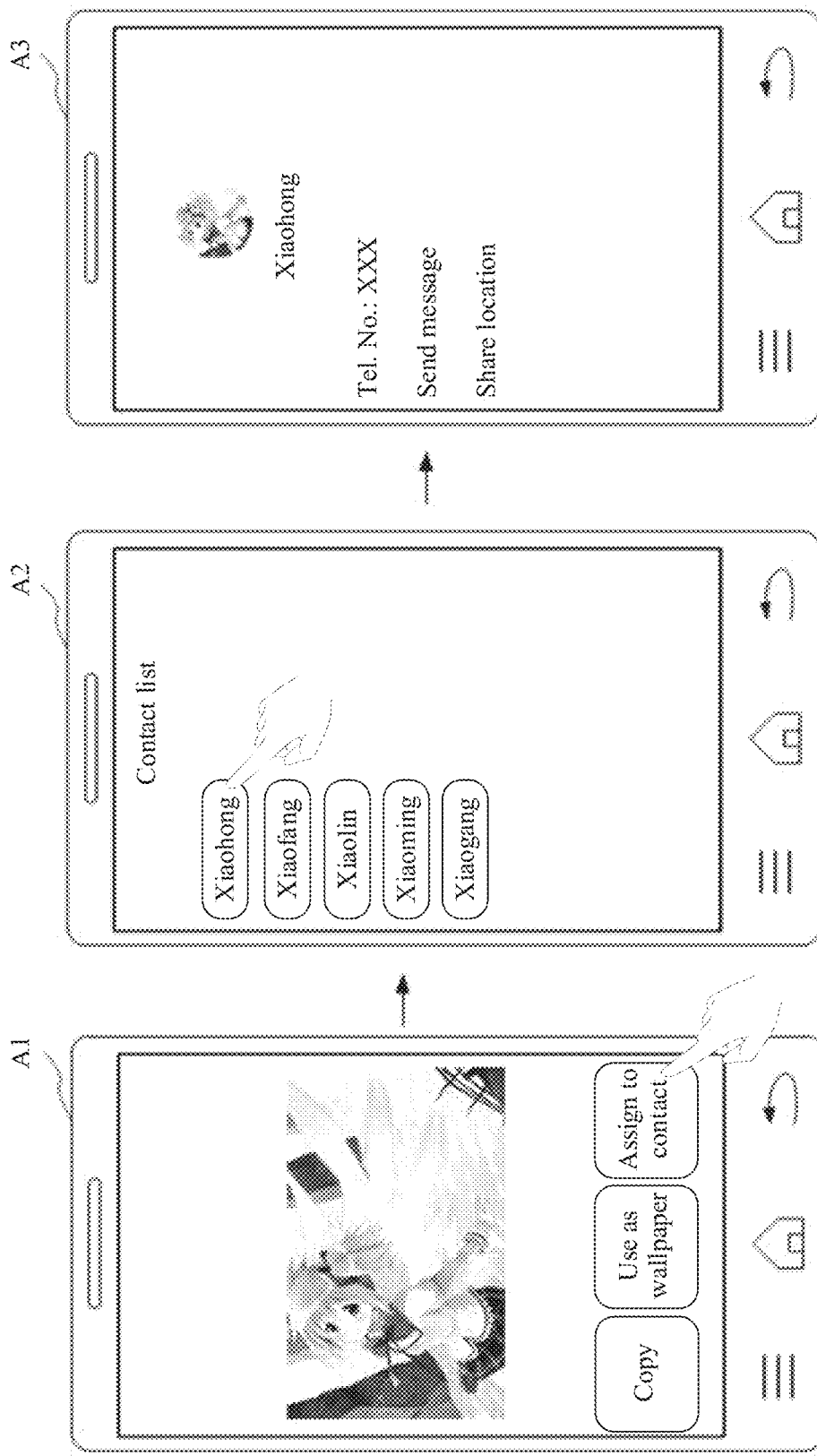
FIG. 3A is a schematic diagram of terminal user interfaces in an application scenario according to an embodiment of this application.

FIG. 3A is a schematic diagram of terminal user interfaces in an application scenario according to an embodiment of this application. Referring to FIG. 3A, the terminal device is a mobile phone, and the terminal user interfaces include a user interface A1, a user interface A2, and a user interface A3.

Referring to the user interface A1, when the mobile phone displays an image (the image may be a local image in the mobile phone or an image in a network), the mobile phone may display at least one operation option for the image. In an example shown in FIG. 3A, image operation options displayed in the user interface A1 include "copy", "set as wallpaper", and "assign to contact". Alternatively, when the mobile phone displays an image, a user may operate a preset icon or a preset button in the mobile phone, so that the mobile phone displays at least one operation option for the image. Assuming that the user needs to set the image as a profile picture of a contact, the user may perform a tap operation on an "assign to contact" icon, so that the mobile phone displays the user interface A2.

Referring to the user interface A2, the mobile phone displays a contact list, and the user may select a contact, so that the mobile phone may process the image by using an image processing method illustrated in this application, and may set the processed image as a profile picture of the selected contact. For example, assuming that the user selects a contact "Xiaohong", the mobile phone may process the image by using the method illustrated in this application, and may set the processed profile picture as a profile picture of the contact "Xiaohong". Certainly; another device (for example, a server) may alternatively process the image by using the image processing method illustrated in this application, and send the processed image to the mobile phone.

Referring to the user interface A3, the mobile phone sets the processed image as the profile picture of the contact "Xiaohong".

Figure 3B:
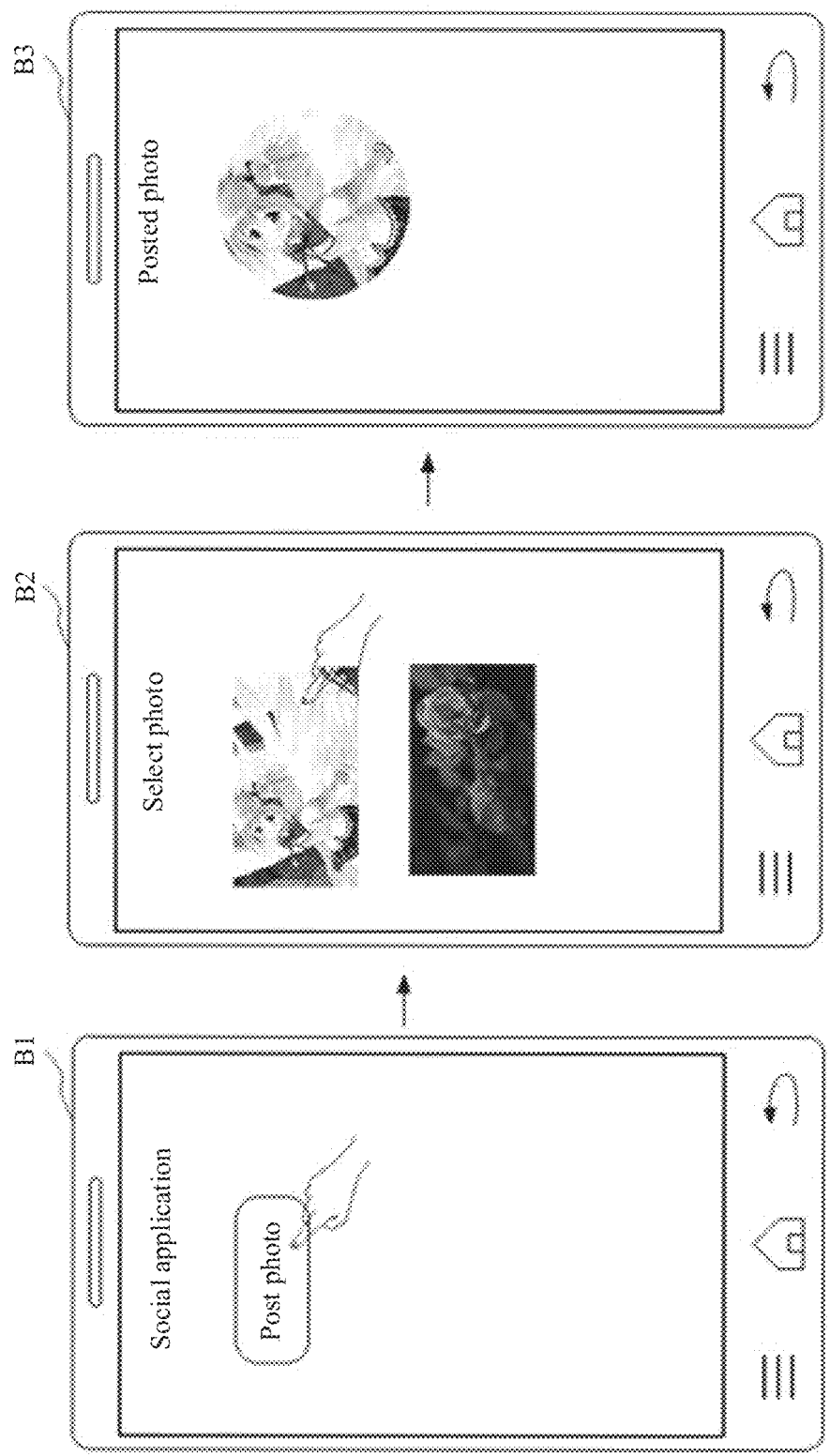
FIG. 3B is a schematic diagram of terminal user interfaces in another application scenario according to an embodiment of this application.

FIG. 3B is a schematic diagram of terminal user interfaces in another application scenario according to an embodiment of this application. Referring to FIG. 313, the terminal device is a mobile phone, and the terminal user interfaces include a user interface B1, a user interface B2, and a user interface B3.

Referring to the user interface B1, a social application is installed in the mobile phone, and the user may post a photo by using the social APP. The social application may be Facebook, WeChat, QQ, or the like. For example, the user may perform a tap operation on a "post photo" icon in the social application, so that the mobile phone displays a photo selection user interface (the user interface B2).

Referring to the user interface B2, the mobile phone displays a photo that can be posted. For example, the photo that can be posted may be an image in a local database of the mobile phone, an image instantly photographed by the mobile phone, or an image in a network. The user may select a photo in the user interface B2, so that the mobile phone displays the user interface B3.

Referring to the user interface B3, the mobile phone may perform, by using the image processing method illustrated in this application, image processing on the photo selected by the user, and display the processed image in the user interface B3. Optionally, after the user posts the photo by using the social application, another user may view the photo posted by the user. Certainly, another device (for example, a server) may alternatively process the image by using the image processing method illustrated in this application, and send the processed image to the mobile phone.

Figure 3C:
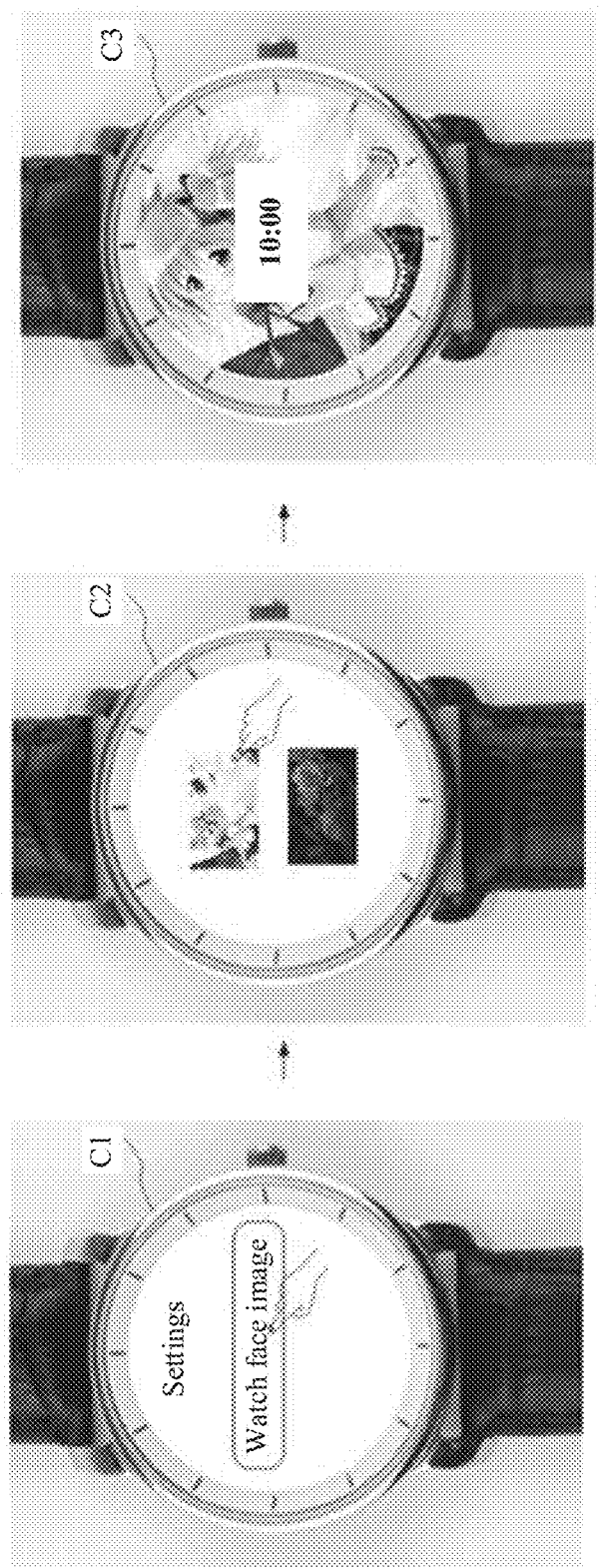
FIG. 3C is a schematic diagram of terminal user interfaces in still another application scenario according to an embodiment of this application.

FIG. 3C is a schematic diagram of terminal user interfaces in still another application scenario according to an embodiment of this application. Referring to FIG. 3C, the terminal device is a smartwatch, and the terminal user interfaces include a user interface C1, a user interface C2, and a user interface C3.

Referring to the user interface C1, the user may perform a control operation on the smartwatch, so that the smartwatch displays a setting user interface. The setting user interface includes a "watch face settings" icon, and the user may perform a tap operation on the "watch face settings" icon, so that the smartwatch displays a photo selection page (the user interface C2).

Referring to the user interface C2, the smartwatch displays a picture that can be used for watch face setting. For example, the picture that can be used for watch face setting may be an image in a local database of the smartwatch or an image in a network. The user may select a photo in the user interface C2, so that the smartwatch displays the user interface 403.

Referring to the user interface C1, the smartwatch may perform, by using the image processing method illustrated in this application, image processing on the photo selected by the user, and set a watch face of the smartwatch as the processed image. After the watch face of the smartwatch is set as the processed image, a current time may be displayed on the terminal watch. Certainly, another device (for example, a mobile phone or a server) may alternatively process the image by using the image processing method illustrated in this application, and send the processed image to the smartwatch.

Figure 3D:
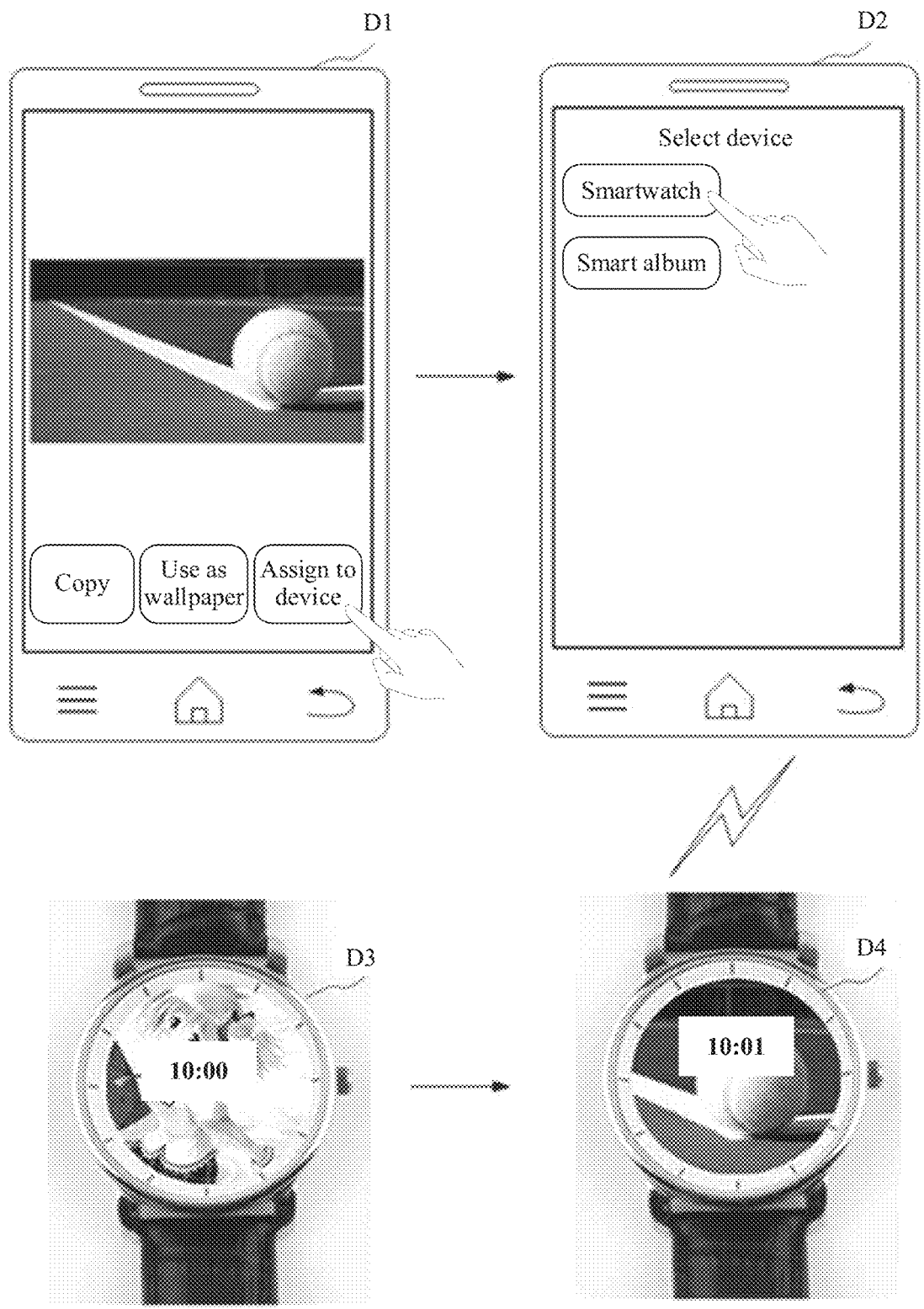
FIG. 3D is a schematic diagram of terminal user interfaces in yet another application scenario according to an embodiment of this application.

FIG. 3D is a schematic diagram of terminal user interfaces in yet another application scenario according to an embodiment of this application. Referring to FIG. 3D, the terminal device includes a mobile phone and a smartwatch, and the terminal user interfaces include a mobile phone user interface D1, a mobile phone user interface D2, a smartwatch user interface D3, and a smartwatch user interface D4.

At a moment t1, a user interface of the mobile phone is the mobile phone user interface D1, and a user interface of the smartwatch is the smartwatch user interface D3. Referring to the mobile phone user interface D1, when the mobile phone displays an image (the image may be a local image in the mobile phone or an image in a network), the mobile phone may display at least one operation option for the image. In an example shown in FIG. 3D, image operation options displayed in the user interface D1 include "copy", "set as wallpaper", and "assign to device". Alternatively, when the mobile phone displays an image, the user may operate a preset icon or a preset button in the mobile phone, so that the mobile phone displays at least one operation option for the image. Assuming that the user needs to set the image as a watch face of the smartwatch, the user may perform a tap operation on an "assign to device" icon, so that the mobile phone displays the mobile phone user interface D2.

Referring to the user interface D2, the mobile phone displays a device to which an assignment can be performed. After the user selects the smartwatch, the mobile phone may process the image by using the image processing method illustrated in this application, and send a setting instruction to the smartwatch. The setting instruction includes the processed image. The smartwatch updates the watch face to the processed image based on the setting instruction. After the watch face is updated, a user interface of the smartwatch is the smartwatch user interface D4. Certainly, another device (for example, a smartwatch or a server) may alternatively process the image by using the image processing method illustrated in this application, and send the processed image to the mobile phone.

FIG. 3A to FIG. 3D are merely examples for illustrating applicable scenarios of this application. Certainly, applicable scenarios of this application may further include other scenarios. For example, this application may be further applicable to setting an image as a screen of the terminal device and sending an image to another terminal device. An applicable scenario is not specifically limited in this application.

Specific embodiments are used below to describe in detail the technical solutions of this application. It should be noted that, the following embodiments may exist alone or may be combined with each other. Same or similar content is not repeatedly described in different embodiments.

Figure 4A:
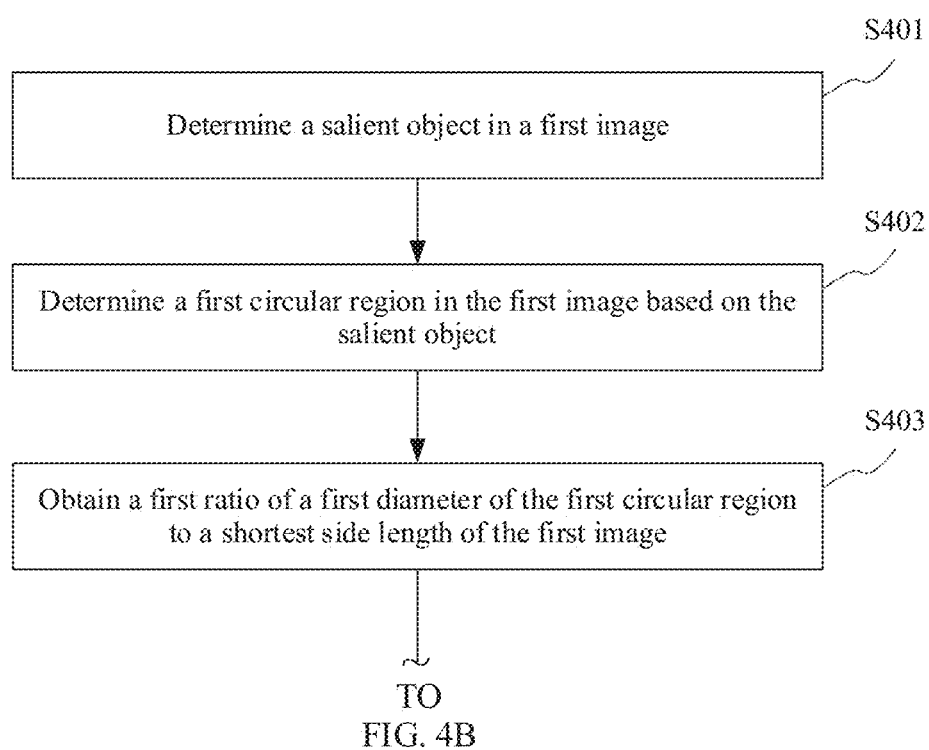
FIG. 4A to FIG. 4C are a schematic flowchart of an image processing method according to an embodiment of this application.
Figure 4B:
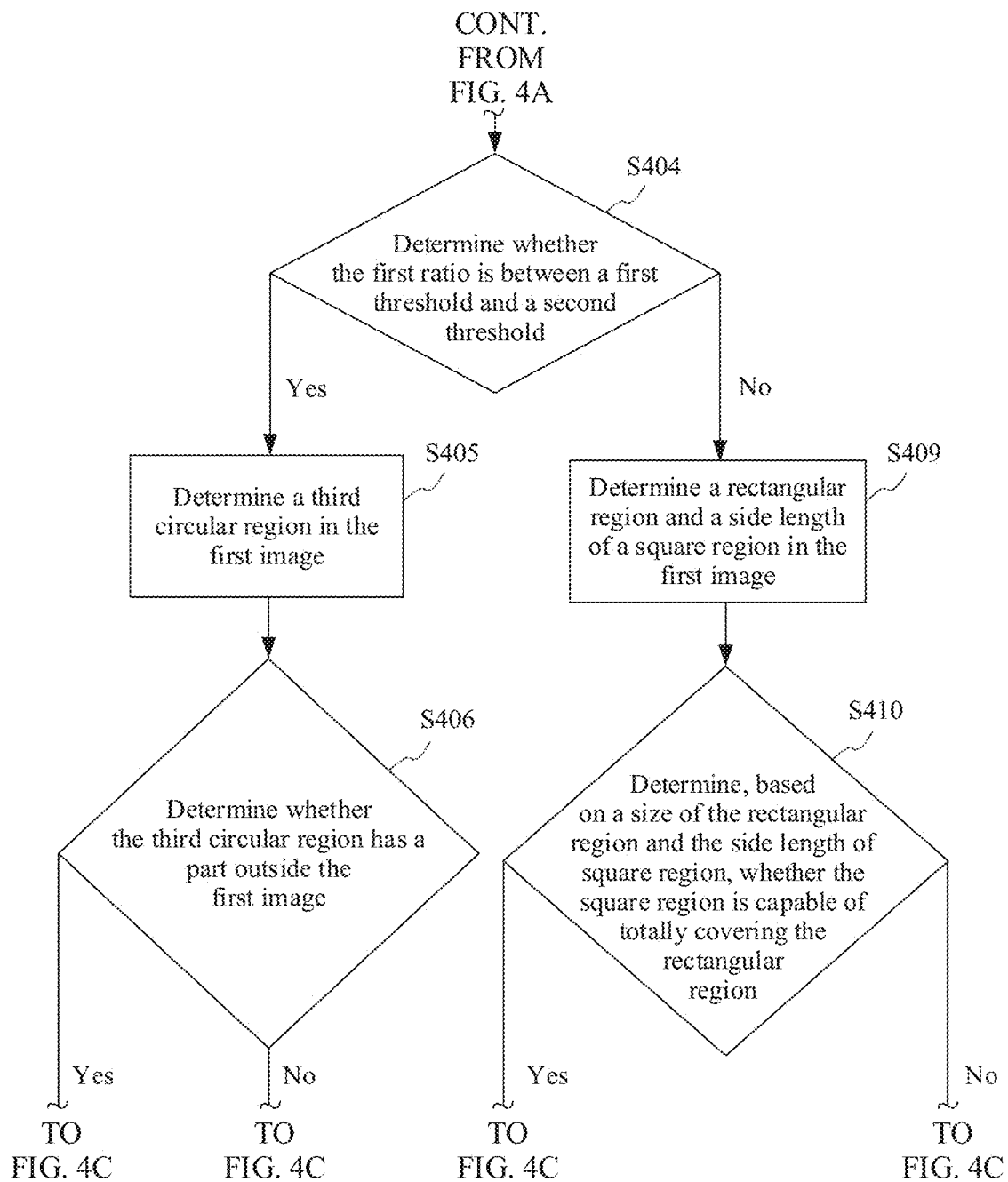
Figure 4C:
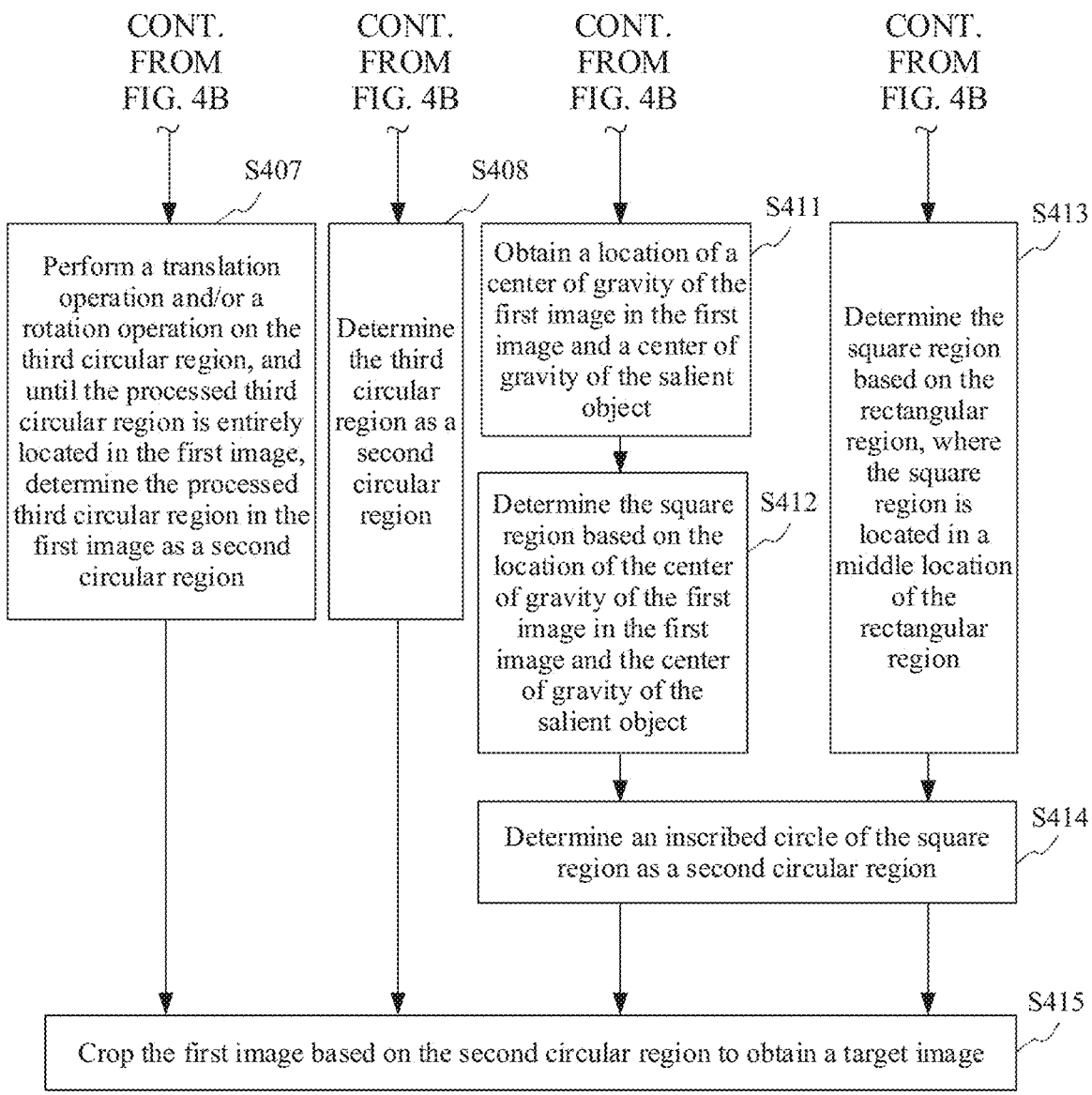

FIG. 4A to FIG. 4C are a schematic flowchart of an image processing method according to an embodiment of this application. Referring to FIG. 4A to FIG. 4C, the method may include the following steps.

S401. Determine a salient object in a first image.

In this embodiment of this application, an execution body may be a terminal device or a server, or may be an image processing apparatus disposed in a terminal device or a server. Optionally, the image processing apparatus may be implemented by software, or may be implemented by a combination of software and hardware.

The first image is a to-be-processed image.

Optionally, the embodiment shown in FIG. 4A to FIG. 4C may start to be executed upon triggering by a user. A manner in which the user triggers execution of the embodiment shown in FIG. 4A to FIG. 4C varies with an application scenario of image processing. For example, when the application scenario is the application scenario shown in the embodiment of FIG. 2, the manner in which the user triggers execution of the embodiment shown in FIG. 4A to FIG. 4C is: the user performs a tap operation on the "assign to contact" icon in the user interface 201, and selects the contact "Xiaohong" in the user interface 202. When the application scenario is the application scenario shown in the embodiment of FIG. 3, the manner in which the user triggers execution of the embodiment shown in FIG. 4A to FIG. 4C is: the user performs a tap operation on the "post photo" icon in the user interface 301, and selects a photo in the user interface 302.

It should be noted that, the determining a salient object in a first image may be further understood as: determining, in the first image, a region (for example, a pixel location) in which the salient object is located. The descriptions "determining a salient object" and "determining a region in which the salient object is located" below have a same meaning.

Optionally, the salient object may be determined in the first image by using a saliency detection model as follows: Data representing the first image is input into the saliency detection model, and the saliency detection model processes the data representing the first image, and outputs data representing the salient object. The data representing the first image may be the first image itself, a grayscale image of the first image, or the like. The data representing the salient object may be a location (for example, a pixel location) of the salient object in the first image, or may be a binary image of the first image (an object in a region with a largest or smallest grayscale value in the binary image is the salient object). The binary image includes pixels of two grayscales. One type is white pixels, and the other type is black pixels. For example, the binary image may include pixels whose grayscale is 0 and pixels whose grayscale is 255.

The saliency detection model is obtained by learning a plurality of sets of samples. Each set of samples include sample images and sample salient objects in the sample images. The sample salient objects may be manually labeled. The sample salient objects may be represented by locations (for example, pixel locations) of the sample salient objects in the sample images.

Figure 5A:
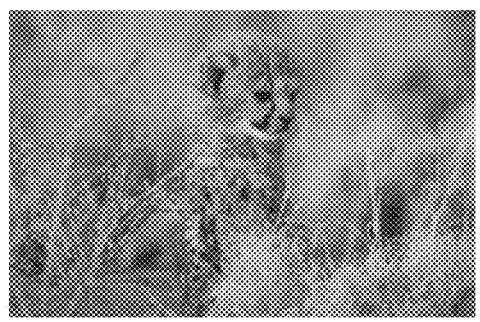
FIG. 5A is a schematic diagram of an image before processing according to an embodiment of this application.
Figure 5B:
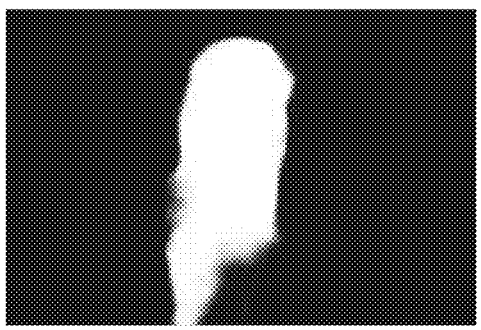
FIG. 5B is a schematic diagram of an image after processing according to an embodiment of this application.

The following describes a process of detecting a salient object by using the saliency detection model with reference to FIG. 5A and FIG. 5B.

FIG. 5A is a schematic diagram of an image before processing according to an embodiment of this application. FIG. 5B is a schematic diagram of an image after processing according to an embodiment of this application. To obtain a salient object in FIG. 5A, data representing FIG. 5A (FIG. 5A, a gray scale image of FIG. 5A, or the like) may be input into the saliency detection model, and the saliency detection model may process the data representing FIG. 5A to output data representing the salient object. For example, the output of the saliency detection model may be FIG. 5B, and an object in a region with a largest grayscale value in FIG. 5B is the salient object.

It should be noted that, the salient object may not be determined or obtained in the first image by using the saliency detection model, or the salient object detected in the first image has relatively low quality (for example, the detected salient object is excessively large or small). In this case, the salient object in the first image may be alternatively obtained by using an image semantic segmentation model.

The salient object is determined in the first image by using the image semantic segmentation model as follows: Data representing the first image is input into the image semantic segmentation model, and the image semantic segmentation model processes the data representing the first image, and outputs data representing the salient object. The data representing the first image may be the first image itself, a grayscale image of the first image, or the like. The data representing the salient object may be a location (for example, a pixel location) of the salient object in the first image, or may be a semantically segmented image and a weight value of each image part in the semantically segmented image. An image part whose weight value is largest and is greater than a preset threshold is the salient object.

The image semantic segmentation model may identify objects in an image and perform segmentation processing on the image based on the objects in the image to obtain a plurality of image parts, where each image part includes one object. Weight values of a plurality of objects may be preset in the image semantic segmentation model. For example, a weight value of a person is 10, a weight value of an animal is 9, a weight value of a building is 8, a weight value of food is 7, a weight value of a vehicle is 6, and a weight value of the sky is 5. The image semantic segmentation model may calculate a weight value of an image part corresponding to an object based on a weight value of the object and an image area of the object in the image.

The saliency detection model is obtained by learning a plurality of sets of samples, each set of samples include sample images and sample segmented images. The sample segmented images include a plurality of segmented image parts. The plurality of segmented image parts may be manually labeled.

Figure 5C:
FIG. 5C is a schematic diagram of another image before processing according to an embodiment of this application.
Figure 5D:
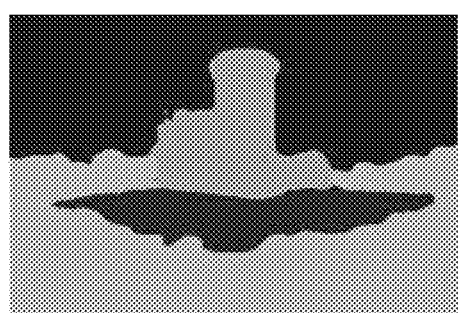
FIG. 5D is a schematic diagram of another image after processing according to an embodiment of this application.

The following describes a process of detecting a salient object by using the image semantic segmentation model with reference to FIG. 5C and FIG. 5D.

FIG. 5C is a schematic diagram of another image before processing according to an embodiment of this application. FIG. 5D is a schematic diagram of another image after processing according to an embodiment of this application. To obtain a salient object in FIG. 5C, data representing FIG. 5C (FIG. 5C, a grayscale image of FIG. 5C, or the like) may be input into the image semantic segmentation model, and the image semantic segmentation model may process the data representing FIG. 5C to output data representing the salient object. For example, the output of the image semantic segmentation model may be FIG. 5D and a weight value of each image part in FIG. 5D. FIG. 5D includes a plurality of image parts, for example, an image part representing the sky, an image part representing a building, and an image part representing water. In FIG. 5D, an object in an image part whose weight value is largest and is greater than a preset threshold is the salient object.

In an actual application process, to improve efficiency and stability of salient object detection, a salient object may be further detected by using both the saliency detection model and the semantic segmentation model. The following describes a process of detecting a salient object by using the saliency detection model and the semantic segmentation model with reference to FIG. 6.

Figure 6:
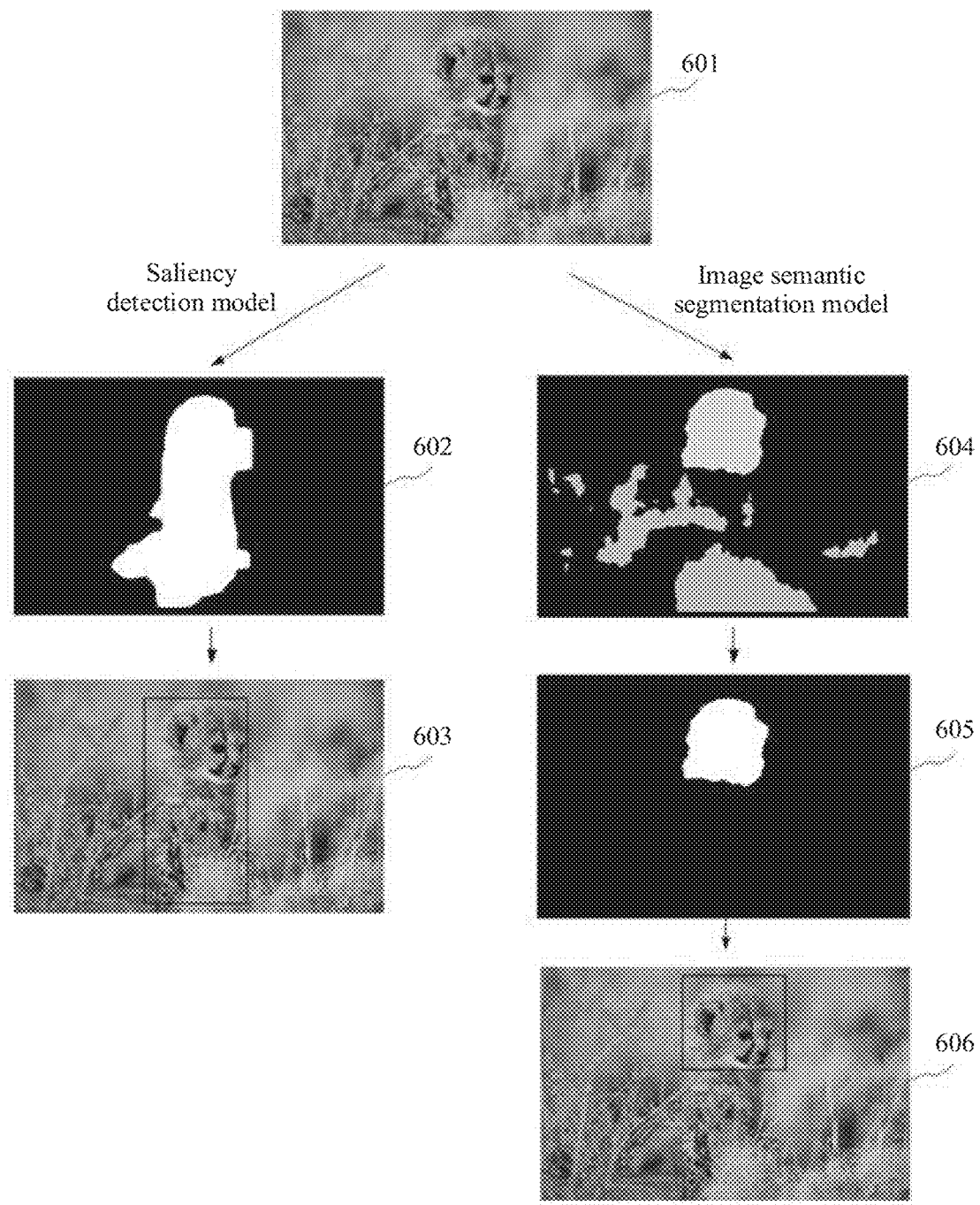
FIG. 6 is a schematic diagram of an image processing process according to an embodiment of this application.

FIG. 6 is a schematic diagram of an image processing process according to an embodiment of this application. Referring to FIG. 6, images 601, 602, 603, 604, 605, and 606 are included.

Referring to FIG. 6, to detect a salient object, input representing the to-be-detected image 601 (the image 601, a grayscale image of the image 601, or the like) is separately input into the saliency detection model and the image semantic segmentation model.

The saliency detection model processes the data representing the image 601 to output data representing the salient object. For example, the output of the saliency detection model may be shown in the image 602, and an object in a region with a largest grayscale value in the image 602 is the salient object. Correspondingly, the salient object detected by the saliency detection model is an object shown in a rectangular frame in the image 603.

The image semantic segmentation model may process the data representing the image 601 to output data representing the salient object. For example, the output of the image semantic segmentation model may be the image 604 and a weight value of each image part in the image 604. The image 604 includes a plurality of image parts, for example, an image part representing an animal head and an image part representing a grassland. In the image 604, an object in an image part whose weight value is largest and is greater than a preset threshold is the salient object. Assuming that the weight value of the image part representing the animal head in the image 604 is largest, it may be determined that an object representing the animal head is the salient object (as shown in the image 605), that is, the salient object detected 1w the image semantic segmentation model is an object shown in a rectangular frame in the image 606.

Because the salient object detected by the saliency detection model is excessively large, the salient object detected by the image semantic segmentation model may be determined as the salient object in the image 601.

It should be noted that, the salient object may not be determined or obtained in the first image by using the image semantic segmentation model. For example, when a maximum weight value of the image parts is less than the preset threshold, the salient object cannot be determined based on the image semantic segmentation model. In this case, the salient object of the first image may be alternatively obtained in a line detection manner.

Line detection is used to detect a salient straight line in an image. Optionally, edge detection (edge detection) may be first performed on the first image to obtain a gradient image, and then edge detection may be performed on the gradient image by using a line detection algorithm, to obtain straight lines in the first image. Edge detection algorithms may include the Sobel algorithm, the Canny algorithm, and the like.

Optionally and alternatively, image semantic segmentation processing may be first performed on the first image (for example, semantic segmentation processing may be performed on the image by using the foregoing image semantic segmentation model) to obtain a semantically segmented image of the first image, and then edge detection may be performed on the semantically segmented image by using a line detection algorithm to obtain straight lines in the first image.

Line detection algorithms may include the Hough line (Hough Line) detection algorithm, the line segment detector (Line Segment Detector. LSD) algorithm, and the like. A principle of the Hough line detection is to transform points in an image in a Cartesian coordinate system into points in a parameter space, and to find a possible straight line by calculating a quantity of points on the straight line by using a statistical method. LSD calculates gradient sizes and directions of points, determines a connected domain based on the calculated gradient sizes and directions of the points, and performs line detection based on the connected domain.

After straight lines are detected in the first image, the salient object may be determined based on an intersection point of the straight lines. For example, an object in a region in which the intersection point of the straight lines is located may be determined as the salient object.

Figure 7A:
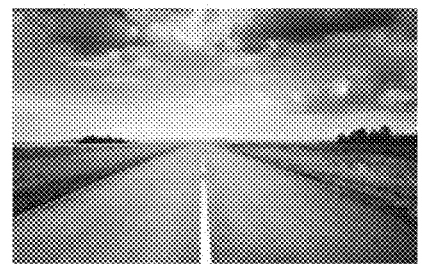
FIG. 7A is a schematic diagram of still another image before processing according to an embodiment of this application.
Figure 7B:
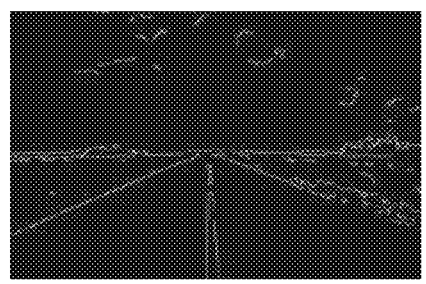
FIG. 7B is a schematic diagram of still another image after processing according to an embodiment of this application.

The following describes a process of detecting a salient object by using the image semantic segmentation model with reference to FIG. 7A and FIG. 7B.

FIG. 7A is a schematic diagram of still another image before processing according to an embodiment of this application. FIG. 7B is a schematic diagram of still another image after processing according to an embodiment of this application. To obtain a salient object in FIG. 7A, line detection may be performed on FIG. 7A to obtain a straight line detection image shown in FIG. 7B. An object in a region in which an intersection point of a plurality of straight lines is located in FIG. 7B may be determined as the salient object.

It should be noted that, the foregoing determines the salient object merely in an example manner. Certainly, the salient object may be determined in the first image in another feasible implementation. This is not specifically limited in this embodiment of this application.

After the salient object is determined in the first image, an image region may be determined in the first image based on the salient object, and the image region may be processed to determine and obtain a second image. Optionally, the image region may be a rectangular region, a circular region, or the like. The following provides a description by using an example in which the image region is a first circular region.

S402. Determine a first circular region in the first image based on the salient object.

The first circular region includes the salient object. For example, the first circular region may be a smallest circular region including the salient object. The smallest circular region including the salient object refers to a circular region that can include all pixels in the salient object and that has a smallest diameter.

Figure 8:
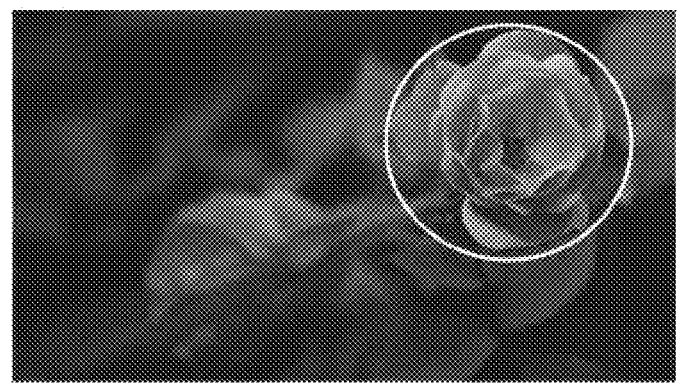
FIG. 8 is a schematic diagram of still another image according to an embodiment of this application.

The following describes the first circular region with reference to FIG. 8.

FIG. 8 is a schematic diagram of still another image according to an embodiment of this application. Referring to FIG. 8, assuming that the determined and obtained salient object is a flower on the right, a region in a circular frame in FIG. 8 is the first circular region.

S403. Obtain a first ratio of a first diameter of the first circular region to a shortest side length of the first image.

S404. Determine whether the first ratio is between a first threshold and a second threshold.

If the first ratio is between the first threshold and the second threshold, S405 to S408 are performed.

If the first ratio is not between the first threshold and the second threshold, S409 is performed.

The first threshold and the second threshold are numbers between 0 and 1, and the first threshold is less than the second threshold.

For example, the first threshold may be 0.33, and the second threshold may be 0.618.

S405. Determine a third circular region in the first image.

A ratio of the diameter of the first circular region to a diameter of the third circular region is a preset ratio. A circle center of the third circular region, a circle center of the first circular region, and a center of the first image are located on a same straight line. The first circular region is internally tangent to the third circular region (the first circular region is an inscribed circle of the third circular region).

Optionally, the preset ratio is a value between 0.5 and 1. For example, the preset ratio may be 0.618.

Optionally, an initial circle center may be determined based on the circle center of the first circular region and the center of the first image. The diameter of the third circular region is determined based on the diameter of the first circular region and the preset ratio. A circle is formed based on the initial circle center and the diameter of the third circular region, so that the first circular region is an inscribed circle of the third circular region.

S406. Determine whether the third circular region has a part outside the first image.

If the third circular region has a part outside the first image. S407 is performed.

If the third circular region has no part outside the first image, S408 is performed.

S407. Perform a translation operation and/or a rotation operation on the third circular region, and until the processed third circular region is entirely located in the first image, determine the processed third circular region in the first image as a second circular region.

Optionally, the translation operation and/or the rotation operation may be performed on the third circular region in the following feasible implementation.

In a possible case, the third circular region has a part outside one edge of the first image.

In this possible case, a connecting line between the circle center of the first circular region and the circle center of the third circular region may be first determined, and a first included angle between the connecting line and a horizontal line (a horizontal edge of the first image) and a second included angle between the connecting line and a vertical line (a vertical edge of the first image) may be obtained.

When either of the first included angle and the second included angle is less than a first preset included angle (for example, 5 degrees or S degrees), the third circular region is translated along a horizontal direction or a vertical direction. Until the translated third circular region is entirely located in the first image (the third circular region is tangent to an edge of the first image), the translated third circular region is determined as the second circular region. For example, when a part in an upper half of the third circular region is located outside the first image, the third circular region is translated downward in the vertical direction; or when a part in a left half of the third circular region is located outside the first image, the third circular region is translated rightward in the horizontal direction.

Figure 9:
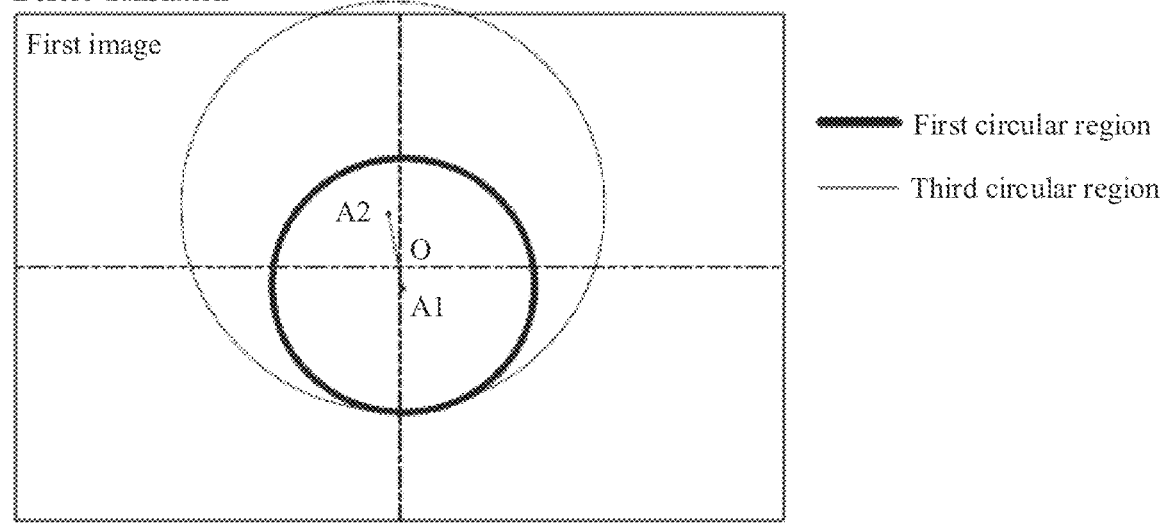
FIG. 9 is a schematic diagram of yet another image according to an embodiment of this application.
Figure 9:
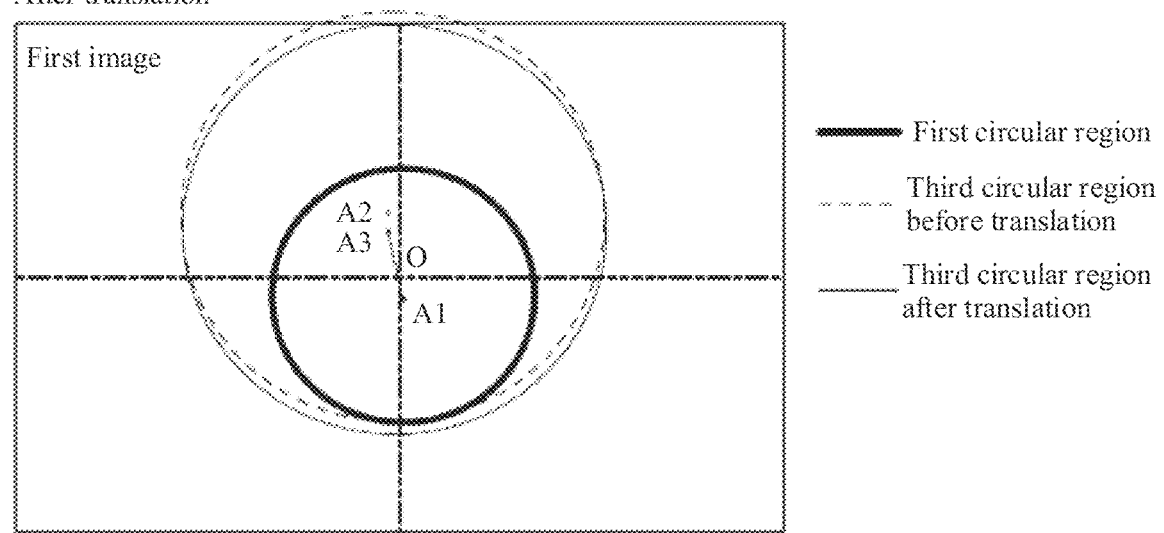

The following describes this feasible implementation with reference to FIG. 9. FIG. 9 is a schematic diagram of yet another image according to an embodiment of this application. Referring to FIG. 9, the center of the first image is O, the circle center of the first circular region that is determined and obtained in the first image is A1, a circle center of the third circular region before translation is A2, and a circle center of the third circular region after translation is A3.

Before the third circular region is translated, O, A1, and A2 are located on a same straight line, and the first circular region is internally tangent to the third circular region. It can be learned from FIG. 9 that, a part in the upper half of the third circular region is located outside the first image. If an included angle between a vertical line (a vertical edge of the first image) and a connecting line between A1 and A2 is less than the first included angle, the third circular region is translated downward until the third circular region is entirely located in the first image.

After the third circular region is translated, the circle center of the third circular region is A3, and the third circular region is entirely located in the first image. O, A1, and A3 are not located on a same straight line, and the first circular region is not internally tangent to the third circular region. The translated third circular region is determined as the second circular region.

In the foregoing process, if either of the first included angle and the second included angle is less than the first preset included angle, translating the third circular region enables the third circular region to be entirely located in the first image, and the translated third circular region can cover the first circular region. An operation method is simple, so that the second circular region can be obtained quickly. Further, a location of the salient object in the second circular region can be further made consistent with the location of the salient object in the first image. This can further enable an image composition of the cropped image to be consistent with an image composition of the first image, thereby improving image cropping quality. For example, if the salient object is located at a location on an upper trisector line of the first image, the salient object is also located at a location on an upper trisector line of the second circular region.

When both the first included angle and the second included angle are greater than the first preset angle (for example, 5 degrees or 8 degrees), the third circular region is rotated. For example, a rotating circle may be formed by using the circle center of the first circular region as a circle center and the line segment between the circle center of the first circular region and the circle center of the third circular region as a radius, and the circle center of the third circular region may be controlled to move on the rotating circle, thereby implementing rotation of the third circular region. In a process of moving the circle center of the third circular region, a rotation angle of the connecting line between the circle center of the third circular region and the circle center of the first circular region is referred to as a rotation angle of the third circular region. The rotated third circular region is still internally tangent to the first circular region (the first circular region is still an inscribed circle of the third circular region). In the process of rotating the third circular region, before the third circular region is rotated by a second preset angle (for example, 30 degrees or 35 degrees), the rotated third circular region is determined as the second circular region when the third circular region is entirely located in the first image. When the third circular region is rotated by the second preset angle, if the rotated third circular region still has a part located outside the first image, the rotated third image is translated until the third image is entirely located in the first image.

Figure 10:
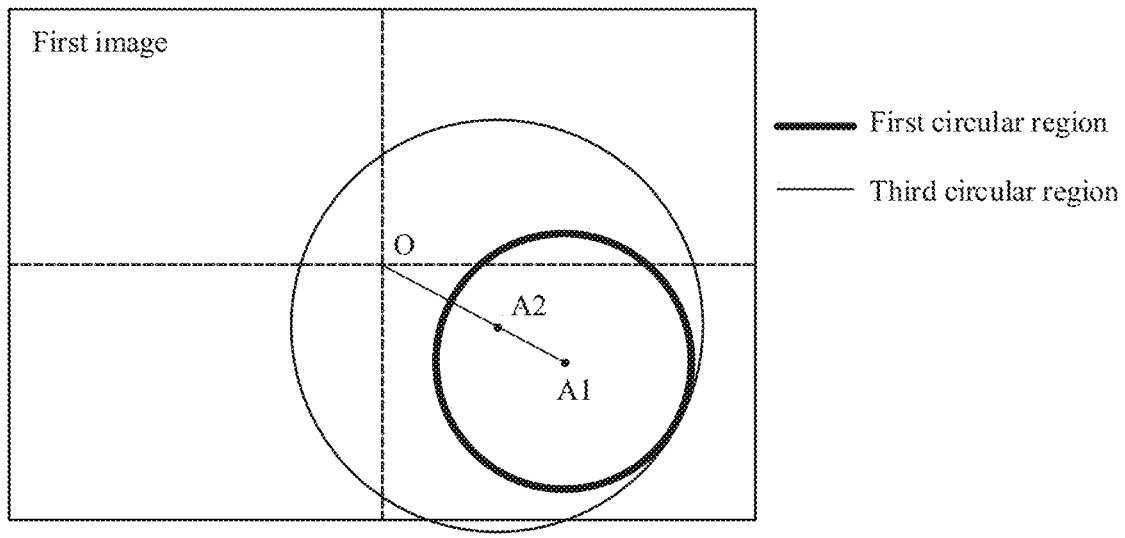
FIG. 10 is a schematic diagram of still yet another image according to an embodiment of this application.
Figure 10:
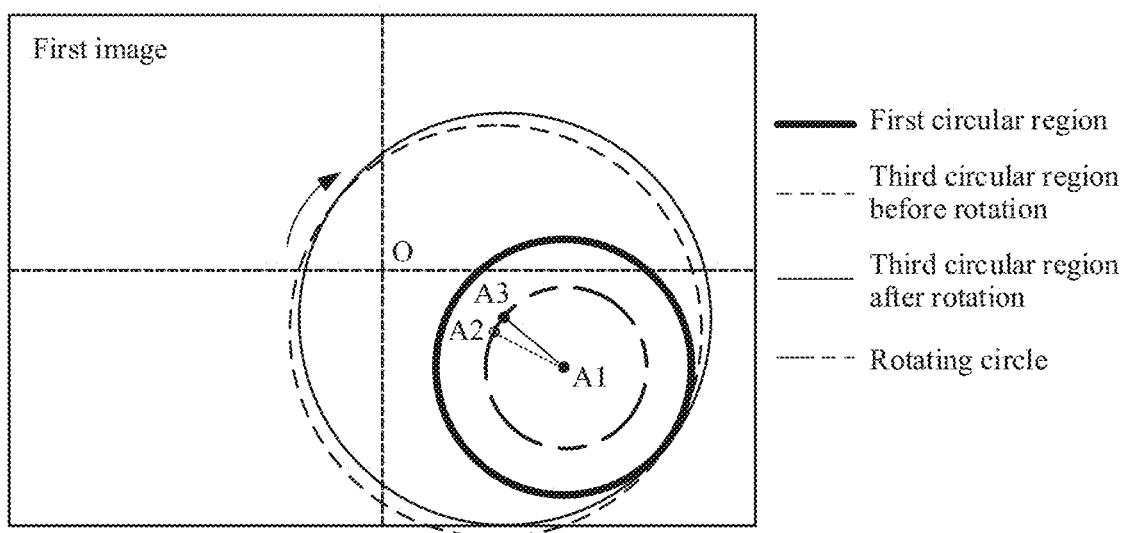
Figure 11:
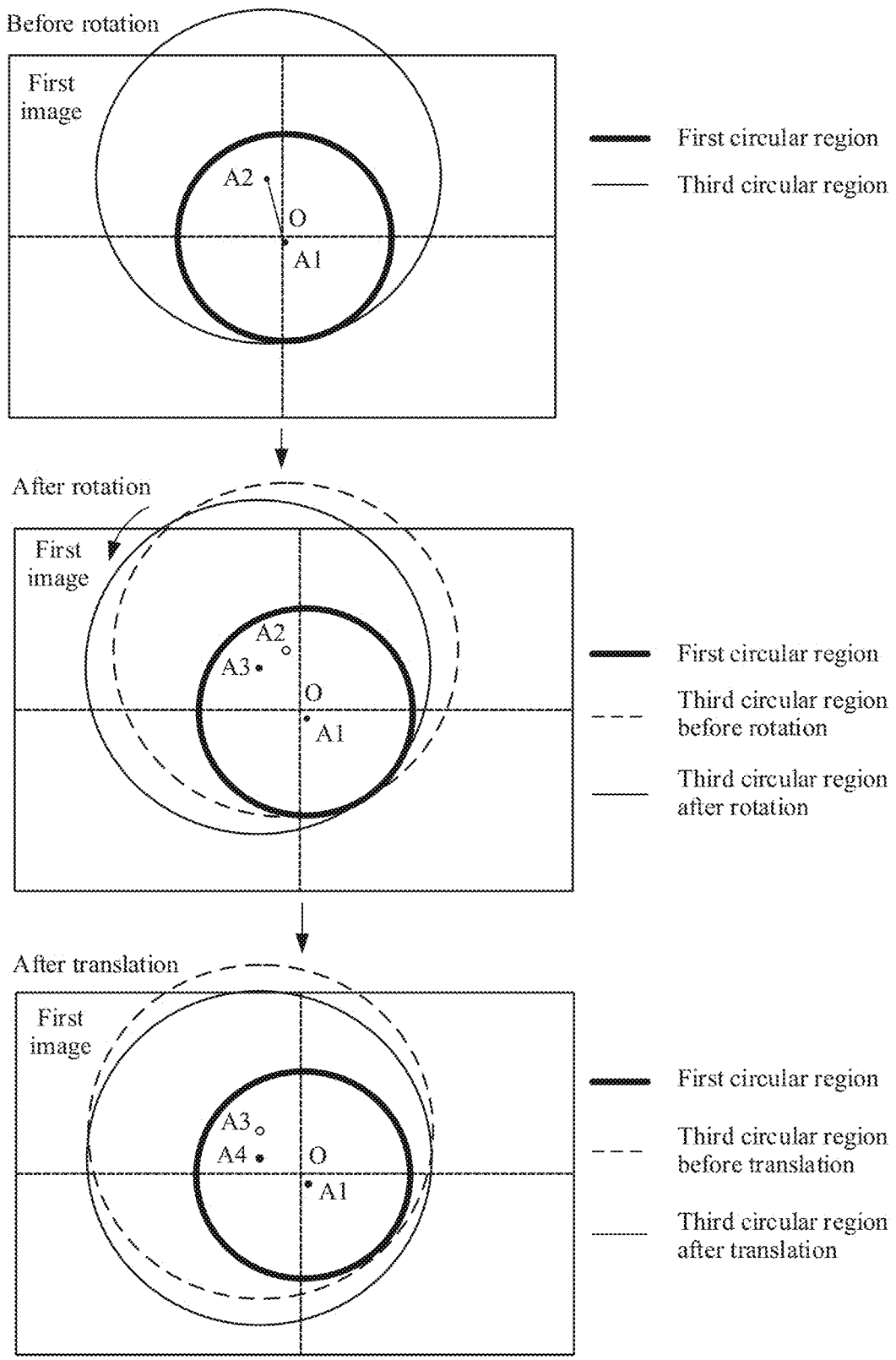
FIG. 11 is a schematic diagram of a further image according to an embodiment of this application.

The following describes this feasible implementation with reference to FIG. 10 and FIG. 11.

FIG. 10 is a schematic diagram of still yet another image according to an embodiment of this application. Referring to FIG. 10, the center of the first image is O, the circle center of the first circular region that is determined and obtained in the first image is A1, a circle center of the third circular region before rotation is A2, and a circle center of the third circular region after rotation is A3.

Before the third circular region is rotated, O, A1, and A2 are located on a same straight line, and the first circular region is internally tangent to the third circular region. It can be learned from FIG. 10 that, a part in a lower half of the third circular region is located outside the first image. If an included angle between a vertical line (a vertical edge of the first image) and a connecting line between A1 and A2 and an included angle between a horizontal line (a horizontal edge of the first image) and the connecting line between A1 and A2 are both greater than the first included angle, the third circular region may be rotated. Because a part in the lower half of the third circular region is located outside the first image, and a point of tangency between the first circular region and the third circular region is located on the lower right of the circular regions, the third circular region may be rotated towards the upper right.

A rotating circle may be formed by using A1 as a circle center and the line segment between A1 and A2 as a radius, and the circle center of the third circular region may be controlled to rotate on the rotating circle towards the upper right. In this way, in a process of rotating the third circular region, it can still be ensured that the third circular region is internally tangent to the first circular region. An included angle between a first connecting line (a connecting line between A1 and A3) and a second connecting line (the connecting line between A1 and A2) may be a rotation angle of the third circular region.

It can be learned from FIG. 10 that, when the rotation angle of the third circular region is less than the second preset angle, and the third circular region is entirely located in the first image, the rotation of the third circular region is stopped. A circle center of the rotated third circular region is A3, O, A1, and A3 are not located on a same straight line, and the first circular region is internally tangent to the third circular region. The translated third circular region is determined as the second circular region.

FIG. 11 is a schematic diagram of a further image according to an embodiment of this application. Referring to FIG. 11, the center of the first image is O, the circle center of the first circular region that is determined and obtained in the first image is A1, a circle center of the third circular region before rotation is A2, a circle center of the third circular region after rotation is A3, and a circle center of the third circular region after translation is A4.

Before the third circular region is rotated, O, A1, and A2 are located on a same straight line, and the first circular region is internally tangent to the third circular region. It can be learned from FIG. 11 that, a part in an upper half of the third circular region is located outside the first image. If an included angle between a vertical line (a vertical edge of the first image) and a connecting line between A1 and A2 and an included angle between a horizontal line (a horizontal edge of the first image) and the connecting line between A1 and A2 are both greater than the first included angle, the third circular region may be rotated. Because a part in the upper half of the third circular region is located outside the first image, and a point of tangency between the first circular region and the third circular region is located on the lower right of the circular regions, the third circular region may be rotated towards the lower left. For a process of rotating the third circular region, refer to the rotation process shown in the embodiment in FIG. 10. Details are not described herein again.

After the third circular region is rotated by the second preset angle, if the third circular region still has a part located outside the first image, the third circular region is translated. Because a part in the upper half of the third circular region is located outside the first image, the third circular region is translated downward until the third circular region is entirely located in the first image. After the third circular region is translated, the circle center of the third circular region is A4, and the third circular region is entirely located in the first image. O, A1, and A4 are not located on a same straight line, and the first circular region is not internally tangent to the third circular region. The translated third circular region is determined as the second circular region.

In the foregoing process, when the first included angle and the second included angle are both greater than the first preset included angle, the third circular region is rotated, or the third circular region is rotated and translated. In this way, the third circular region is entirely located in the first image, and the translated third circular region can cover the first circular region. Further, with the foregoing method, a location of the salient object in the second circular region can be further made consistent with the location of the salient object in the first image. This can further enable the image composition of the cropped second image to be consistent with the image composition of the first image, thereby improving image cropping quality.

In another possible case, the third circular region has a part outside two edges of the first image.

In this possible case, the third circular region may be translated in the horizontal direction and the vertical direction, and until the third circular region is entirely located in the first image, the third circular region is determined as the second circular region.

Figure 12:
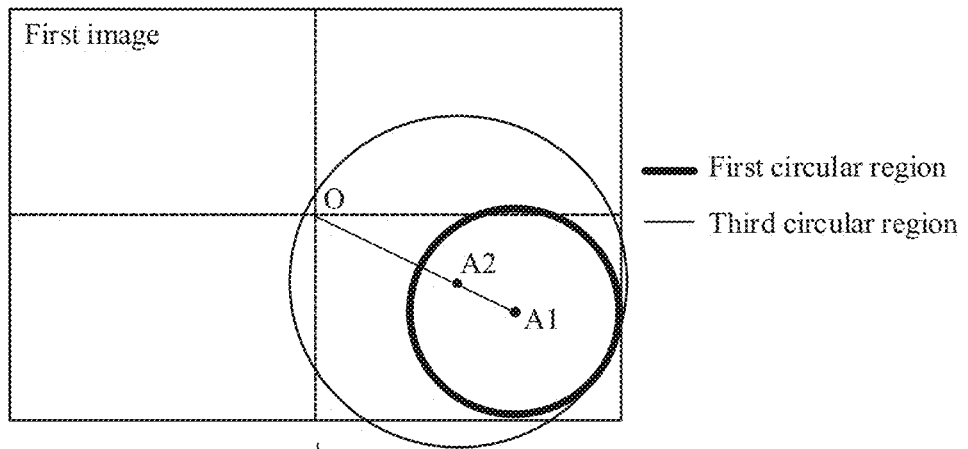
FIG. 12 is a schematic diagram of a still further image according to an embodiment of this application.
Figure 12:
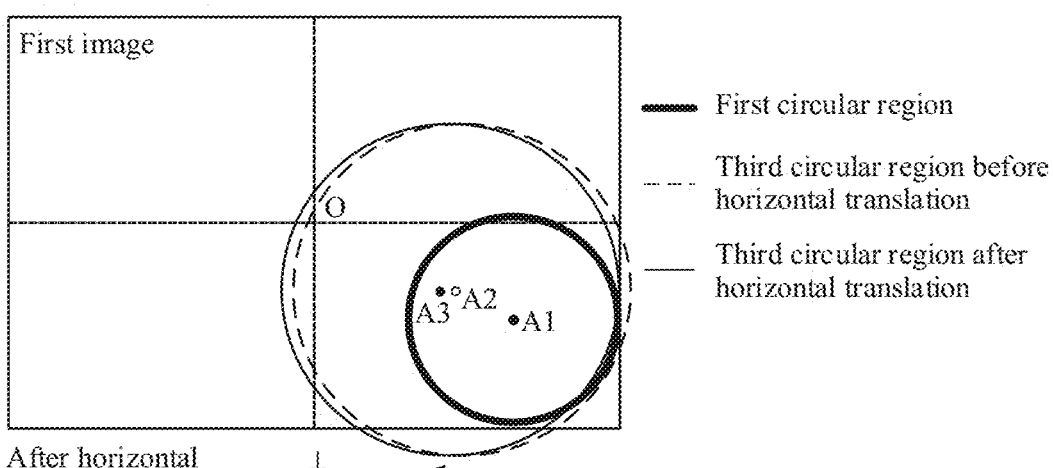
Figure 12:
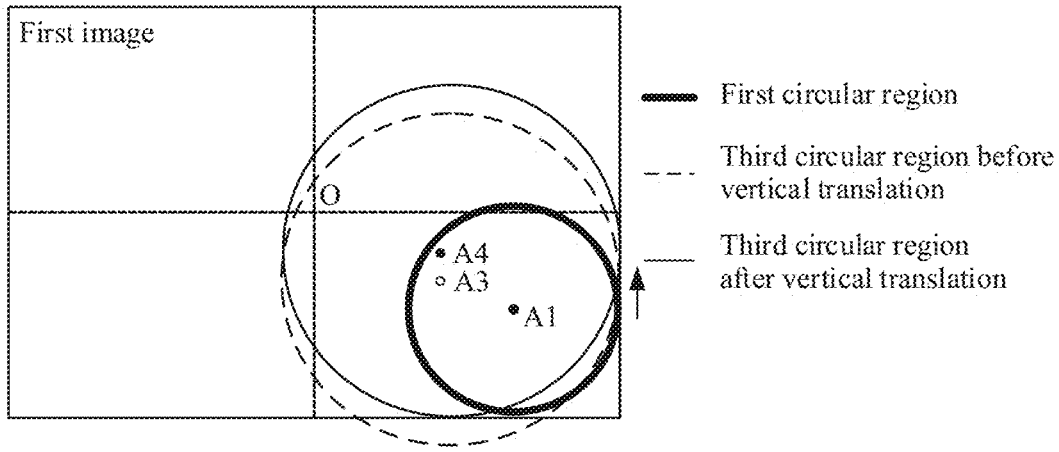

The following describes this feasible implementation with reference to FIG. 12. FIG. 12 is a schematic diagram of a still further image according to an embodiment of this application. Referring to FIG. 12, the center of the first image is O, the circle center of the first circular region that is determined and obtained in the first image is A1, a circle center of the third circular region before horizontal translation and vertical translation is A2, a circle center of the third circular region after horizontal translation and before vertical translation is A3, and a circle center of the third circular region after horizontal translation and vertical translation the is A4.

Before the third circular region is translated, O, A1, and A2 are located on a same straight line, and the first circular region is internally tangent to the third circular region. It can be learned from FIG. 12 that, a part in a lower half and a part in a right half of the third circular region are located outside the first image. In this case, the third circular region may be translated in the horizontal direction and the vertical direction.

The third circular region may be first translated in the horizontal direction. Because a part in the right half of the third circular region is located outside the first image, the third circular region may be translated leftward. Until the third circular region is tangent to a right edge of the first image, the third circular region is stopped from being translated leftward. After the horizontal translation is performed on the third circular region, the circle center of the third circular region is A3.

After the third circular region is translated in the horizontal direction, the third circular region is further translated in the vertical direction. Because a part in the lower half of the third circular region is located outside the first image, the third circular region may be translated upward. Until the third circular region is tangent to a lower edge of the first image, the third circular region is stopped from being translated upward. After the vertical translation is performed on the third circular region, the circle center of the third circular region is A4. O, A1, and A4 are not located on a same straight line, and the first circular region is not internally tangent to the third circular region. The translated third circular region is determined as the second circular region.

In the foregoing process, when the third circular region has a part located outside two edges of the first image, translating the third circular region enables the third circular region to be entirely located in the first image. An operation method is simple, so that the second circular region can be obtained quickly. Further, a location of the salient object in the second circular region can be further made consistent with the location of the salient object the first image. This can further enable the image composition of the cropped image to be consistent with the image composition of the first image, thereby improving image cropping quality.

After S407, S415 is performed.

S408. Determine the third circular region as a second circular region.

When it is determined that the third circular region has no part located outside the first image, that is, the third circular region is entirely located in the first image, the third circular region is determined as the second circular region.

After S408, S415 is performed.

S409. Determine a rectangular region and a side length of a square region in the first image.

The rectangular region is a smallest rectangular region including the salient object.

Figure 13:
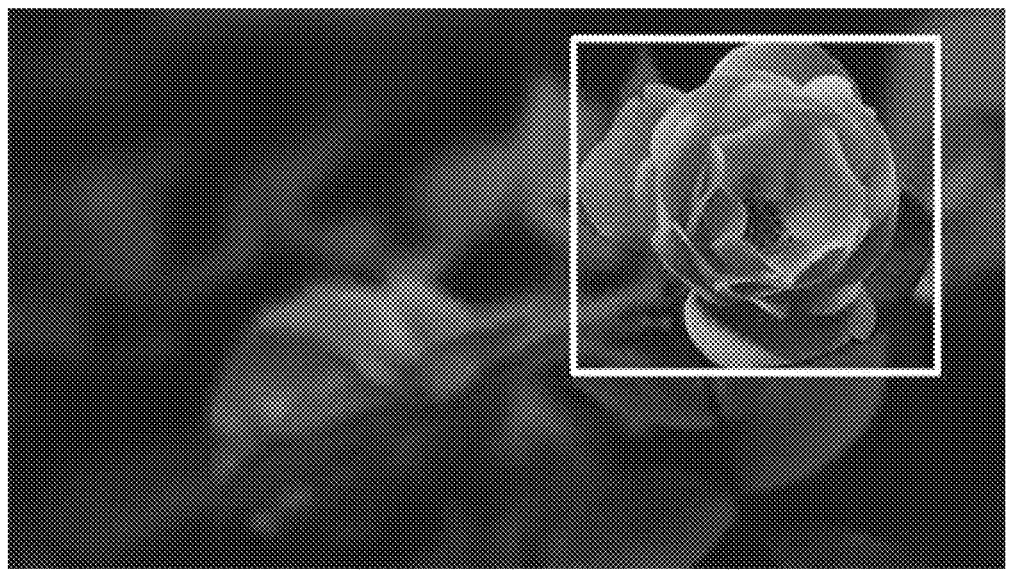
FIG. 13 is a schematic diagram of a yet further image according to an embodiment of this application.

The following describes the rectangular region with reference to FIG. 13.

FIG. 13 is a schematic diagram of a yet further image according to an embodiment of this application. Referring to FIG. 13, assuming that the determined and obtained salient object is a flower on the right, a region in a rectangular frame in FIG. 13 is the rectangular region.

The side length of the square region is equal to the shortest side length of the first image. For example, the side length of the square region is equal to a width of the first image shown in FIG. 13.

It should be noted that, in S409, only the side length of the square region is determined. A location of the square region in the first image is not determined or obtained.

S410. Determine, based on a size of the rectangular region and the side length of the square region, whether the square region is capable of totally covering the rectangular region.

If the square region is capable of totally covering the rectangular region, S411 and S412 are performed.

If the square region is incapable of totally covering the rectangular region, S413 is performed.

Optionally, it may be determined whether the side length of the square region is greater than each side length of the rectangular region. If the side length of the square region is greater than each side length of the rectangular region, it is determined that the square region is capable of totally covering the rectangular region; or if the side length of the square region is not greater than each side length of the rectangular region, it is determined that the square region is incapable of totally covering the rectangular region.

S411. Obtain a location of a center gravity of the first image in the first image and a center of gravity of the salient object.

Optionally; the location of the center of gravity of the first image in the first image is at least one of the following locations: a location near the center, a location near a trisector line, or a location near an edge. The location near a trisector line includes: a location near an upper trisector line, a location near a lower trisector line, a location near a left trisector line, and a location near a right trisector line. The location near an edge includes: a location near an upper edge, a location near a lower edge, a location near a left edge, and a location near a right edge.

Optionally, the location of the center of gravity of the first image in the first image may be obtained in the following feasible implementation: determining the center of gravity of the first image; obtaining a first distance between the center of gravity of the first image and a center of the first image, a second distance between the center of gravity of the first image and a first trisector line of the first image, and a third distance between the center of gravity of the first image and a first edge of the first image; and determining the location of the center of gravity of the first image in the first image based on the first distance, the second distance, and the third distance. In a plurality of trisector lines of the first image, the distance between the center of gravity of the first image and the first trisector line is shortest, and in a plurality of edges of the first image, the distance between the center of gravity of the first image and the first edge is shortest.

If the first distance is less than the second distance and the third distance, it is determined that the location of the center of gravity of the first image in the first image is the location near the center.

If the second distance is less than the first distance and the third distance, it is determined that the location of the center of gravity of the first image in the first mage is the location near a trisector line. If the first trisector line is the upper trisector line, the location of the center of gravity of the first image in the first image is the location near the upper trisector line. If the first trisector line is the lower trisector line, the location of the center of gravity of the first image in the first image is the location near the lower trisector line. If the first trisector line is the left trisector line, the location of the center of gravity of the first image in the first image is the location near the left trisector line. If the first trisector line is the right trisector line, the location of the center of gravity of the first image in the first image is the location near the right trisector line.

If the third distance is less than the first distance and the second distance, it is determined that the location of the center of gravity of the first image in the first image is the location near an edge. If the first edge is the upper edge, the location of the center of gravity of the first image in the first image is the location near the upper edge. If the first edge is the lower edge, the location of the center of gravity of the first image in the first image is the location near the lower edge. If the first edge is the left edge, the location of the center of gravity of the first image in the first image is the location near the left edge. If the first edge is the right edge, the location of the center of gravity of the first image in the first image is the location near the right edge.

S412. Determine the square region based on the location of the center of gravity of the first image in the first image and the center of gravity of the salient object.

In a possible case, the location of the center of gravity of the first image in the first image is the location near the center.

The square region is determined based on the center of gravity of the salient object and a center of the square region, where the center of gravity of the salient object is located at a central location of the square region.

Figure 14:
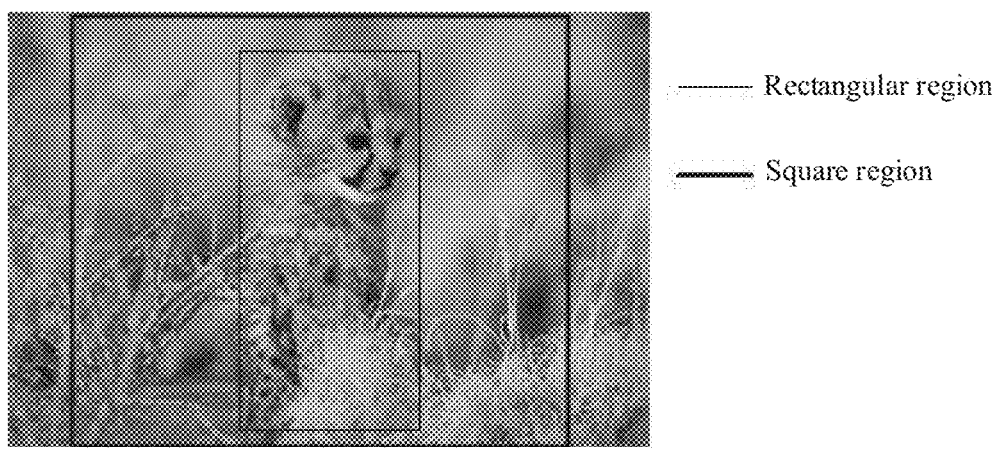
FIG. 14 is a schematic diagram of a still yet further image according to an embodiment of this application.

The following describes a process of determining the square region in this case with reference to FIG. 14.

FIG. 14 is a schematic diagram of a still yet further image according to an embodiment of this application. Referring to FIG. 14, assuming that the salient object determined in the first image is an animal, the rectangular region is shown in FIG. 4, and the rectangular region in FIG. 14 is a minimum rectangular region including the salient object (the animal). It can be learned from FIG. 14 that, the animal is located at a central location of the first image, and further it may be determined that the center of gravity of the first image is located at the central location of the first image. Therefore, a square region shown in FIG. 14 may be determined and obtained. A side length of the square region is equal to the width of the first image. The rectangular region is located at a central location of the square region.

In another possible case, the location of the center of gravity of the first image in the first image is the location near a trisector line.

The square region is determined based on the center of gravity of the salient object and a second trisector line of the square region, where the center of gravity of the salient object is located on the second trisector line. The first trisector line and the second trisector line have a same type, and types of trisector lines include the upper trisector line, the lower trisector line, the left trisector line, and the right trisector line.

Figure 15:
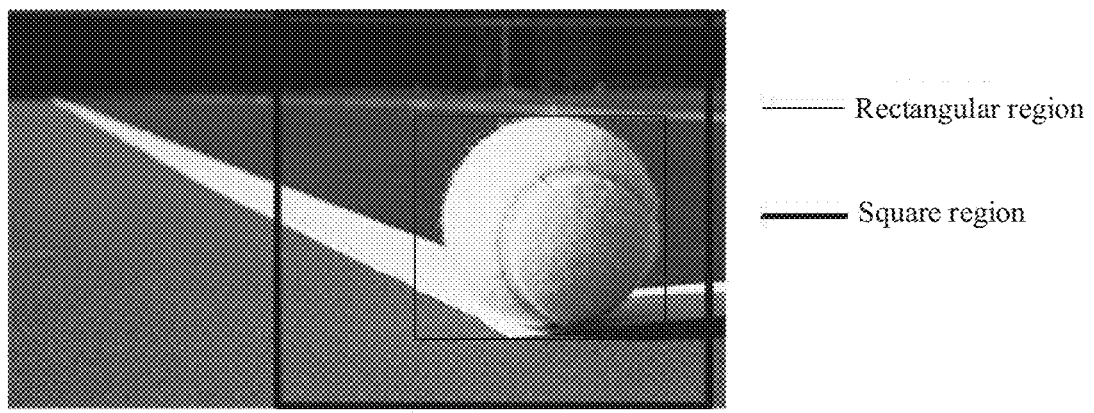
FIG. 15 is a schematic diagram of even yet another image according to an embodiment of this application.

The following describes a process of determining the square region in this case with reference to FIG. 15.

FIG. 15 is a schematic diagram of even yet another image according to an embodiment of this application. Referring to FIG. 15, assuming that the salient object determined in the first image is a ball, the rectangular region is shown in FIG. 15, and the rectangular region in FIG. 15 is a minimum rectangular region including the salient object (the ball). It can be learned from FIG. 15 that, the ball is located at a location on the right trisector line of the first image, and further it may be determined that the center of gravity of the first image is located at the location on the right trisector line of the first image. Therefore, a square region shown in FIG. 15 may be determined and obtained. A side length of the square region is equal to the width of the first image. The rectangular region is located at a location on a right trisector line of the square region.

In still another possible case, the location of the center of gravity of the first image in the first image is the location near an edge.

The square region is determined based on the center of gravity of the salient object and a second edge of the square region, where a distance between the center of gravity of the salient object and the second edge is less than a preset distance. The second edge and the first edge have a same type, and types of edges include the upper edge, the lower edge, the left edge, and the right edge.

Figure 16:
FIG. 16 is a schematic diagram of even yet still another image according to an embodiment of this application.

The following describes a process of determining the square region in this case with reference to FIG. 16.

FIG. 16 is a schematic diagram of even yet still another image according to an embodiment of this application. Referring to FIG. 16, assuming that the salient object determined in the first image is a cartoon character, the rectangular region is shown in FIG. 16, and the rectangular region in FIG. 16 is a minimum rectangular region including the salient object (the cartoon character). It can be learned from FIG. 16 that, the cartoon character is located on the left edge of the first image, and further it may be determined that the center of gravity of the first image is located at a location on the left edge of the first image. Therefore, a square region shown in FIG. 16 may be determined and obtained. A side length of the square region is equal to the width of the first image. The rectangular region is located at a location on a left edge of the square region.

In the foregoing process, a location of the rectangular region in the square region is determined based on the location of the center of gravity of the first image in the first image, and a location of the salient object in the square region can be made consistent with the location of the salient object in the first image. This can further enable the image composition of the cropped image to be consistent with the image composition of the first image, thereby improving image cropping quality.

After S412, S414 is performed.

S413. Determine the square region based on the rectangular region, where the square region is located at a middle location of the rectangular region.

Figure 17:
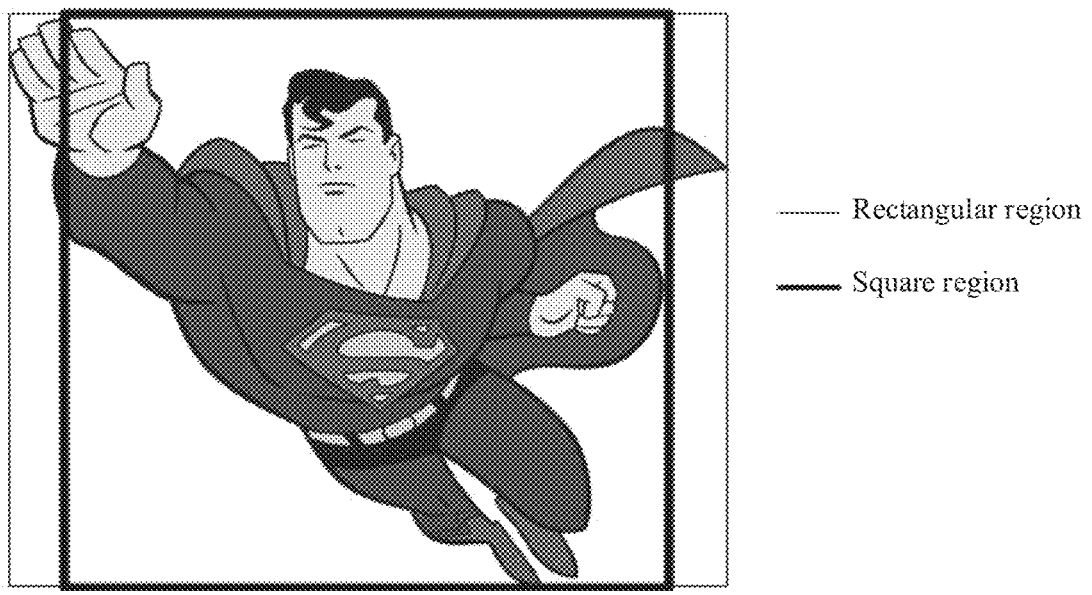
FIG. 17 is a schematic diagram of an even further image according to an embodiment of this application.

The following describes a process of determining the square region in this case with reference to FIG. 17.

FIG. 17 is a schematic diagram of an even further image according to an embodiment of this application. Referring to FIG. 17, assuming that the salient object determined in the first image is a cartoon character, the rectangular region is shown in FIG. 17, and the rectangular region in FIG. 17 is a minimum rectangular region including the salient object (the cartoon character). A side length of the rectangular region determined in FIG. 17 is equal to the width of the first image. However, any location of the square region in the first image cannot enable the square region to totally cover the rectangular region. Therefore, the square region may be disposed at a middle location of the rectangular region.

S414. Determine an inscribed circle of the square region as a second circular region.

S415. Crop the first image based on the second circular region to obtain a second image.

Figure 18:
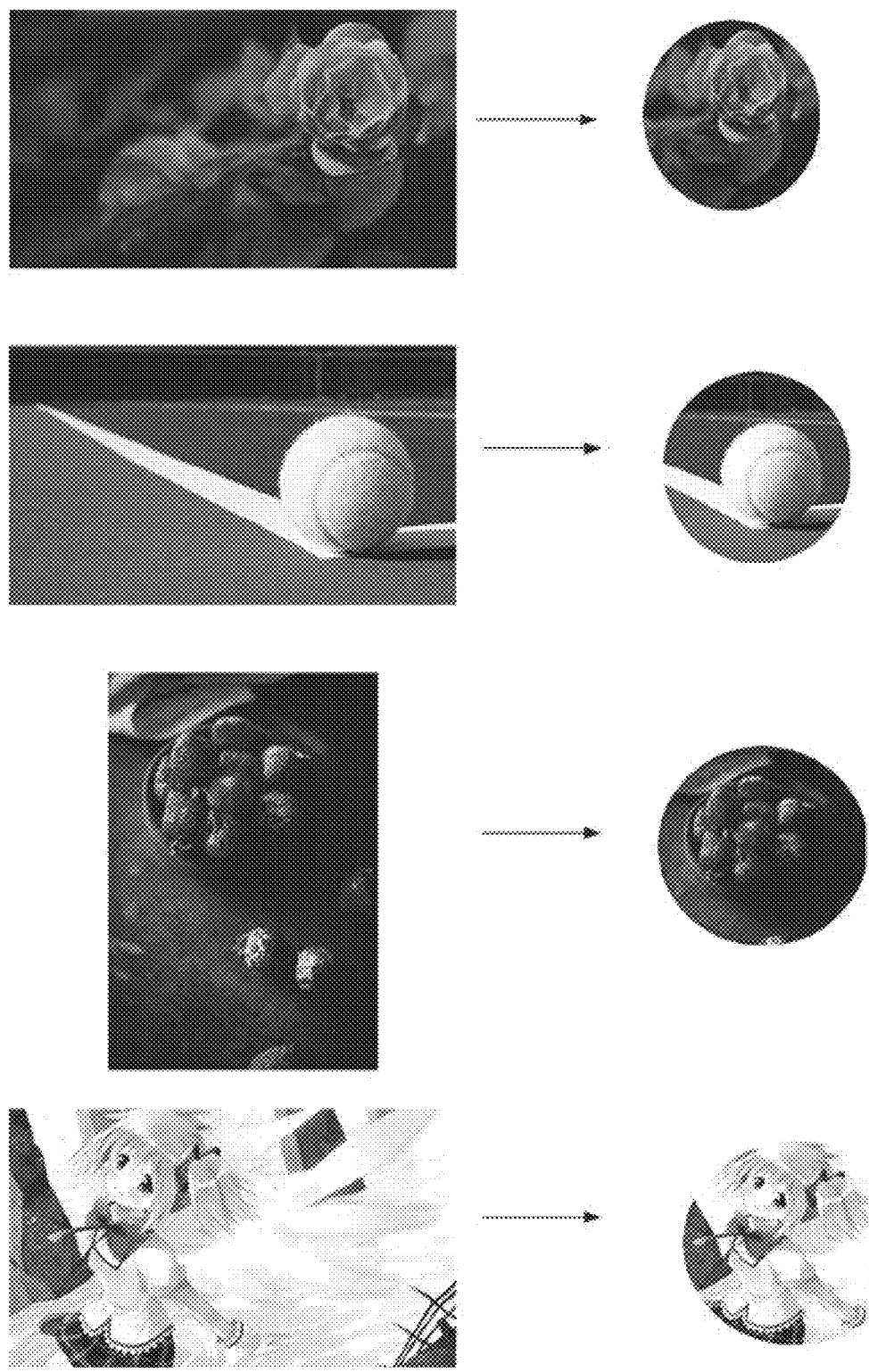
FIG. 18 is a schematic diagram of image cropping according to an embodiment of this application.

The following describes the second image obtained by cropping with reference to FIG. 18.

FIG. 18 is a schematic diagram of image cropping according to an embodiment of this application. Referring to FIG. 18, a plurality of images and second images obtained by cropping the plurality of images are shown.

It should be noted that, the processing steps (S401 to S415) illustrated in the embodiment of FIG. 4A to FIG. 4C do not constitute a specific limitation on the image processing process. In some other embodiments of this application, the image processing process may include more or fewer steps than those in the embodiment of FIG. 4A to FIG. 4C. For example, the image processing process may include some steps in the embodiment of FIG. 4A to FIG. 4C, or some steps in the embodiment of FIG. 4A to FIG. 4C may be replaced by steps having a same function, or some steps in the embodiment of FIG. 4A to FIG. 4C may be split into a plurality of steps, or the like.

According to the image processing method provided in this embodiment of this application, the salient object is first obtained in the to-be-processed first image, and cropping processing is performed on the first image based on the location of the salient object in the first image to obtain the cropped second image. In this way, not only the second image can include the salient object, but also the location of the salient object in the first image can be made consistent with a location of the salient object in the second image. This can further enable the image composition of the cropped second image to be consistent with the image composition of the first image, thereby improving image cropping quality.

Figure 19:
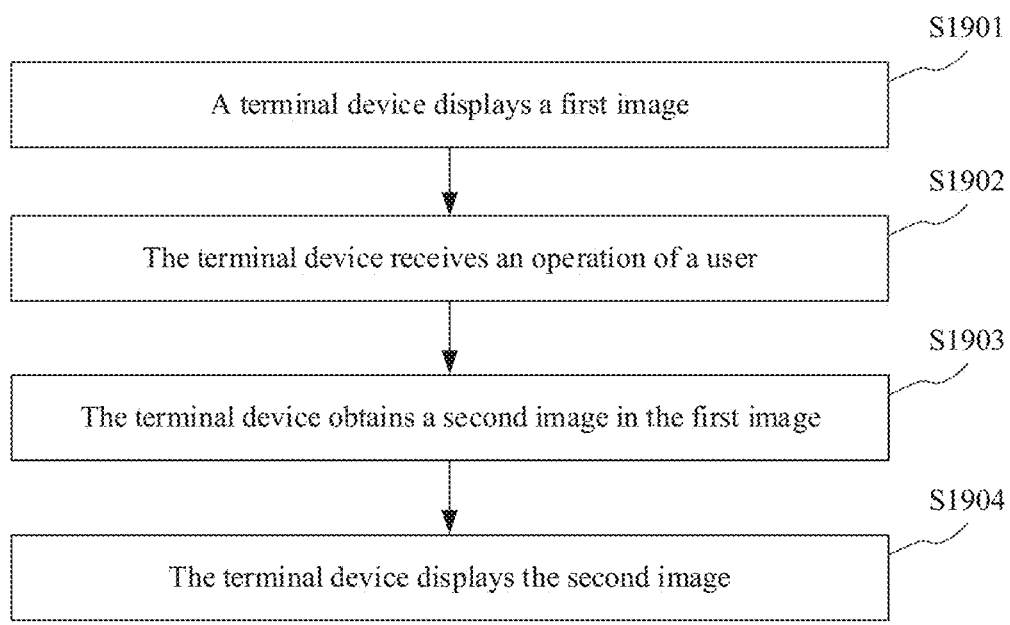
FIG. 19 is a schematic flowchart of another image processing method according to an embodiment of this application.

Based on any one of the foregoing embodiments, the following describes the image processing method illustrated in this application with reference to FIG. 19.

FIG. 19 is a schematic flowchart of another image processing method according to an embodiment of this application. Referring to FIG. 19, the method may include the following steps.

S1901. A terminal device displays a first image.

The first image has a first size.

Optionally; the first image may be a local image of the terminal device (for example, an image in a gallery of the terminal device), or a network image, or the like.

A shape of the first image may be a square, a rectangle, a polygon, or the like.

Optionally, the terminal device may display a maximized image of the first image based on the size of the first image. For example, referring to FIG. 3A and FIG. 3D, the terminal device displays the maximized image of the first image based on the size of the first image.

Optionally, the terminal device may further display a thumbnail of the first image. For example, referring to FIG. 313, the terminal device displays the thumbnail of the first image.

Optionally, the terminal device may receive an operation of a user to display the first image. For example, the user may open the local gallery of the terminal device, and open the first image in the local gallery, so that the terminal device displays the first image. Alternatively, the user may perform an operation on a terminal function in the terminal device, so that the terminal device displays the first image. For example, referring to FIG. 3B, the user performs a tap operation on the "post photo" icon in the social application, so that the terminal device displays the first image.

S1902. The terminal device receives an operation of a user.

The operation of the user is any one of the following operations: a profile picture setting operation, a screen setting operation, a picture sharing operation, a contact list operation, and a picture sending operation.

For example, referring to FIG. 3A, the profile picture setting operation may include: the user performs a tap operation on the "assign to contact" icon in the user interface A1, and the user performs a tap operation on the "Xiaohong" icon in the user interface A2.

For example, referring to FIG. 3B, the image sharing operation may include: the user performs a tap operation on the "post photo" icon in the user interface B1, and the user inputs a tap operation on a photo.

For example, referring to FIG. 3C, the screen setting operation may include: the user performs a tap operation on a "watch face image" icon in the user interface C1, and the user inputs a tap operation on a photo.

It should be noted that, the foregoing merely describes the operation of the user as an example, but does not limit the operation of the user.

S1902. The terminal device obtains a second image in the first image.

The second image has a second size, the second size is less than the first size, and the second image includes salient content on the first image.

The salient content refers to image content including a salient object. For example, referring to FIG. 1A, the salient object in FIG. 1A is a cartoon character. In this case, the salient content is a circular image region in which the cartoon object is located. For example, referring to FIG. 1B, the salient object in FIG. 1B is an animal. In this case, the salient content is a circular image region in which the animal is located.

Optionally, the terminal device may process the first image by using the method shown in the embodiment of FIG. 4A to FIG. 4C, to obtain the second image.

Optionally, the terminal device may request another device (for example, a device such as a server) to process the first image by using the method shown in the embodiment of FIG. 4A to FIG. 4C to obtain the second image. Then, the terminal device obtains the second image from the another device.

It should be noted that, in a process in which the terminal device or the server processes the first image by using the method shown in the embodiment of FIG. 4A to FIG. 4C, the first image may be processed by using some steps in the embodiment of FIG. 4A to FIG. 4C or by using all steps in the embodiment of FIG. 4A to FIG. 4C.

S1903. The terminal device displays the second image.

Optionally; the second image may be displayed on a display page corresponding to a terminal function of the terminal device.

For example, referring to FIG. 3A, the terminal function is a profile picture setting function, and the user interface A3 is a display page corresponding to the terminal function.

For example, referring to FIG. 3B, the terminal function is a picture sharing function, and the user interface B3 is a display page corresponding to the terminal function.

For example, referring to FIG. 3C, the terminal function is a screen setting function, and the user interface C3 is a display page corresponding to the terminal function.

In the embodiment shown in FIG. 19, after the terminal device displays the first image, the user may input an operation into the terminal device, so that the terminal device displays the second image in the first image. The second image is a part of the first image and the second image includes the salient content in the first image. In a process of obtaining the second image, the salient object is first obtained in the to-be-processed first image, and cropping processing is performed on the first image based on a location of the salient object in the first image to obtain the cropped second image. In this way, not only the second image can include the salient object, but also the location of the salient object in the first image can be made consistent with a location of the salient object in the second image. This can further enable an image composition of the cropped second image to be consistent with an image composition of the first image, thereby improving image cropping quality.

Figure 20:
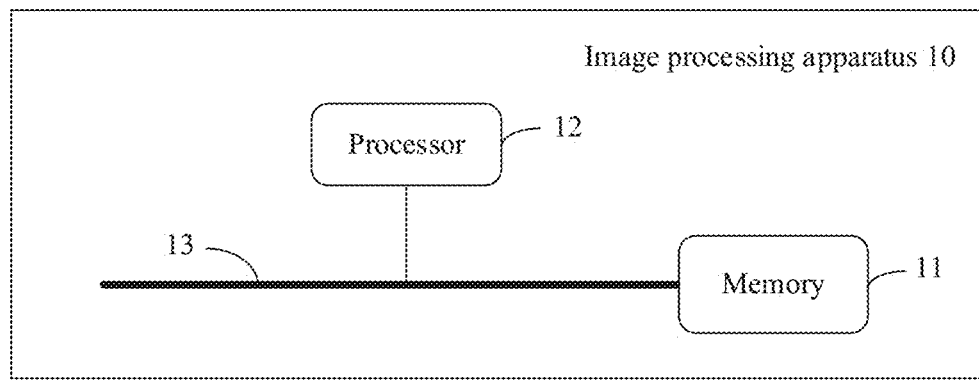
FIG. 20 is a schematic diagram of a structure of an image processing apparatus according to an embodiment of this application.

FIG. 20 is a schematic diagram of a structure of an image processing apparatus according to an embodiment of this application. Referring to FIG. 20, an image processing apparatus 10 may include a memory 11 and a processor 12. The memory 11 communicates with the processor 12. For example, the memory 11 may communicate with the processor 12 by using a communications bus 13. The memory 11 is configured to store a computer program, and the processor 12 executes the computer program to implement the foregoing image processing method.

Figure 21:
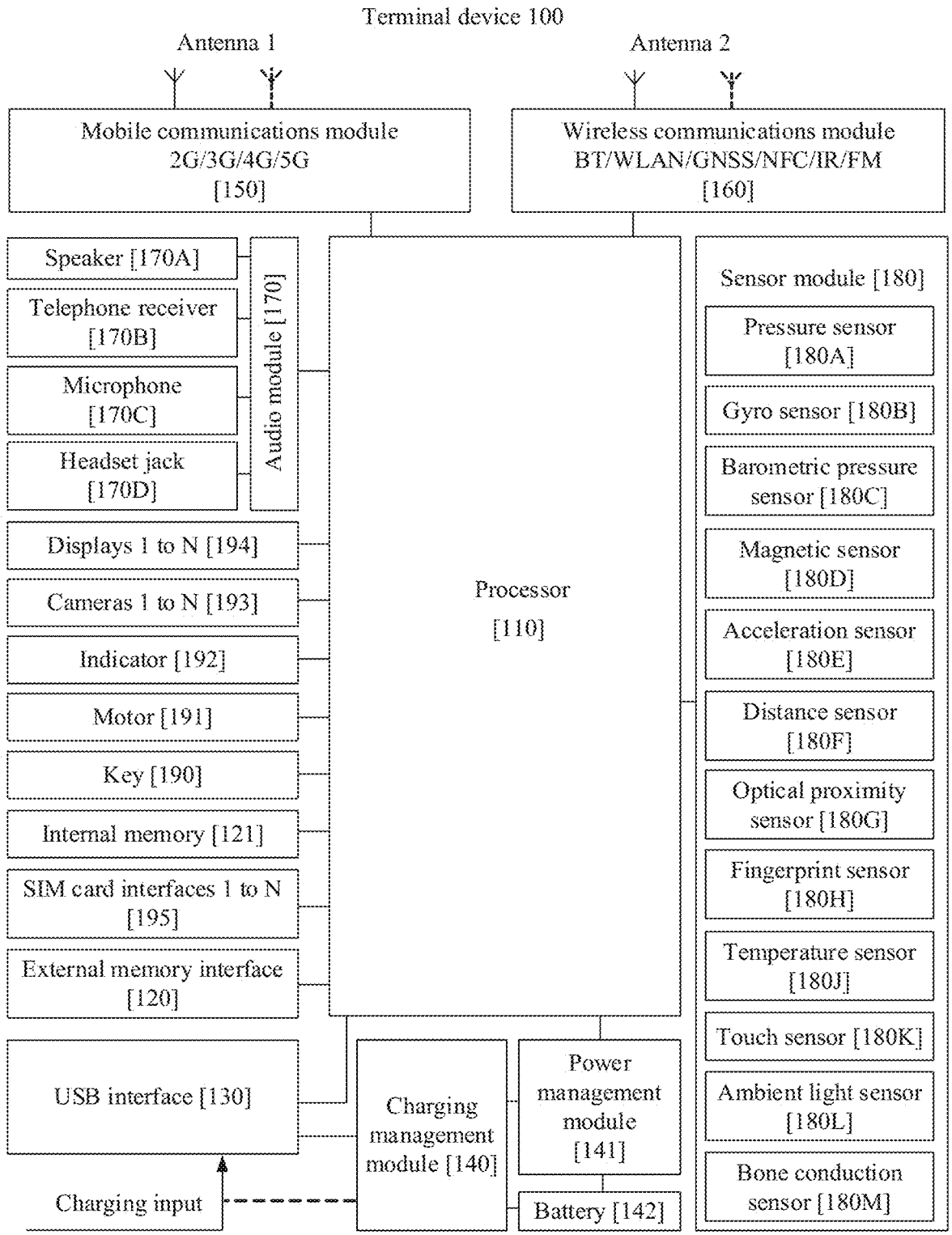
FIG. 21 is a schematic diagram of a structure of a terminal device according to an embodiment of this application.

FIG. 21 is a schematic diagram of a structure of a terminal device according to an embodiment of this application. Referring to FIG. 21, a terminal device 100 may include a processor 110, an external memory interface 120, an internal memory 121, a universal serial bus (universal serial bus, USB) interface 130, a charging management module 140, a power management module 141, a battery 142, an antenna an antenna 2, a mobile communications module 150, a wireless communications module 160, an audio module 170, a speaker 170A, a telephone receiver 170B, a microphone 170C, a headset jack 170D, a sensor module 180, a key 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that, a structure illustrated in this embodiment of this application does not constitute a specific limitation on the terminal device 100. In some other embodiments of this application, the terminal device 100 may include more or fewer components than those shown in the figure, or combine some components, or split some components, or have different component arrangements. The illustrated components may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor. ISP), a controller, a video codec, a digital signal processor (digital signal processor, DSP), a baseband processor, a neural-network processing unit (neural-network processing unit, NPU), and/or the like. The different processing units may be independent devices, or may be integrated into one or more processors.

The controller may generate an operation control signal based on instruction operation code and a timing signal, and complete control on instruction fetching and instruction execution.

A memory may be further disposed in the processor 110, and is configured to store instructions and data. In some embodiments, the memory in the processor 110 is a cache memory. The memory may store instructions or data that has just been used or has been repeatedly used by the processor 110. If the processor 110 needs to use the instruction or data again, it may directly invoke the instruction or data from the memory. This avoids repeated access, reduces a waiting time of the processor 110, and therefore improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus, including one serial data line (serial data line, SDA) and one serial clock line (serial clock line, SCL). In some embodiments, the processor 110 may include a plurality of I2C buses. The processor 110 may be separately coupled to the touch sensor 180K, a charger, a flashlight, the camera 193, and the like by using different I2C bus interfaces. For example, the processor 110 may be coupled to the touch sensor 180K by using an I2C interface, so that the processor 110 communicates with the touch sensor 180K by using the I2C bus interface to implement a touch function of the terminal device 100.

The I2S interface may be configured for audio communication. In some embodiments, the processor 110 may include a plurality of I2S buses. The processor 110 may be coupled to the audio module 170 by using an I2S bus to implement communication between the processor 110 and the audio module 170. In some embodiments, the audio module 170 may transfer an audio signal to the wireless communications module 160 by using the I2S interface, to implement a function of answering calls by using a Bluetooth headset.

The PCM interface may also be configured for audio communication, and sampling, quantization and encoding of analog signals. In some embodiments, the audio module 170 and the wireless communications module 160 may be coupled by using the PCM bus interface. In some embodiments, the audio module 170 may also transfer an audio signal to the wireless communications module 160 by using the PCM interface, to implement a function of answering calls by using a Bluetooth headset. Both the I2S interface and the PCM interface may be configured for audio communication.

The UART interface is a universal serial data bus for asynchronous communication. The bus may be a bidirectional communications bus. It converts data to be transmitted between serial communication and parallel communication. In some embodiments, the UART interface is usually configured to connect the processor 110 to the wireless communications module 160. For example, the processor 110 communicates with a Bluetooth module in the wireless communications module 160 by using the UART interface, to implement a Bluetooth function. In some embodiments, the audio module 170 may transfer an audio signal to the wireless communications module 160 by using the UART interface, to implement a function of playing music by using a Bluetooth headset.

The MIPI interface may be configured to connect the processor 110 to peripheral devices such as the display 194 and the camera 193. The MIPI interface includes a camera serial interface (camera serial interface, CSI), a display serial interface (display serial interface, DSI), and the like. In some embodiments, the processor 110 communicates with the camera 193 by using the CSI interface to implement a photographing function of the terminal device 100. The processor 110 communicates with the display 194 by using the DSI interface to implement a display function of the terminal device 100.

It can be understood that, the interface connection relationship between the modules illustrated in this embodiment of this application is merely an example for description, and does not constitute a limitation on the structure of the terminal device 100. In some other embodiments of this application, the terminal device 100 may alternatively use different interface connection manners in the foregoing embodiments or a combination of a plurality of interface connection manners.

The mobile communications module 150 may provide a wireless communications solution applied to the terminal device 100, including 2G, 3G, 4G, 5G, or the like. The mobile communications module 150 may include at least one filter, a switch, a power amplifier, a low noise amplifier (low noise amplifier, LNA), and the like. The mobile communications module 150 may receive an electromagnetic wave by using the antenna 1, perform processing such as filtering and amplification on the received electromagnetic wave, and transmit the received electromagnetic wave to the modem processor for demodulation. The mobile communications module 150 may further amplify a signal modulated by the modem processor, and convert the signal into an electromagnetic wave by using the antenna 1 for radiation. In some embodiments, at least some functional modules of the mobile communications module 150 may be disposed in the processor 110. In some embodiments, at least some functional modules of the mobile communications module 150 and at least some functional modules of the processor 110 may be disposed in a same device.

The modem processor may include a modulator and a demodulator. The modulator is configured to modulate a to-be-sent low frequency baseband signal into a medium and high frequency signal. The demodulator is configured to demodulate a received electromagnetic wave signal into a low frequency baseband signal. Then, the demodulator transmits the low frequency baseband signal obtained through demodulation to the baseband processor for processing. After being processed by the baseband processor, the low frequency baseband signal is transferred to the application processor. The application processor outputs a sound signal through an audio device (not limited to the speaker 170A, the telephone receiver 170B, or the like), or display an image or a video by using the display 194. In some embodiments, the modem processor may be an independent device. In some other embodiments, the modem processor may be independent of the processor 110, and disposed in a same device together with the mobile communications module 150 or another functional module.

The wireless communications module 160 may provide wireless communication solutions applicable to the terminal device 100, such as a wireless local area network (wireless local area networks, WLAN) (such as a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), and an infrared (infrared, IR) technology. The wireless communications module 160 may be one or more devices integrating at least one communications processing module. The wireless communications module 160 receives an electromagnetic wave through the antenna 2, performs frequency modulation and filtering processing on the electromagnetic wave signal, and transmits the processed signal to the processor 110. The wireless communications module 160 may further receive a to-be-sent signal from the processor 110, perform frequency modulation and amplification on the signal, and convert the signal into an electromagnetic wave by using the antenna 2 for radiation.

In some embodiments, the antenna 1 of the terminal device 100 is coupled to the mobile communications module 150, and the antenna 2 thereof is coupled to the wireless communications module 160, so that the terminal device 100 can communicate with a network and another device by using a wireless communications technology. The wireless communication technology may include global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system DDS), a quasi-zenith satellite system (quasi-zenith satellite system, QZSS), and/or a satellite based augmentation system (satellite based augmentation systems, SBAS).

The terminal device 100 implements a display function by using the GPU, the display 194, the application processor, and the like. The GPU is a microprocessor for image processing, and is connected to the display 194 and the application processor. The GPU is configured to perform mathematical and geometric calculation for graphics rendering. The processor 110 may include one or more GPUs that execute program instructions to generate or change display information.

The display 194 is configured to display an image, a video, and the like. The display 194 includes a display panel. The display panel may use a liquid crystal display (liquid crystal display, LCD), an organic light-emitting diode (organic light-emitting diode, OLED), an active-matrix organic light-emitting diode (active-matrix organic light emitting diode, AMOLED), a flex light-emitting diode (flex light-emitting diode, FLED), a mini LED, a micro LED, a micro OLED, a quantum dot light emitting diode (quantum dot light emitting diode, QLED), or the like. In some embodiments, the terminal device 100 may include one or N displays 194, where N is a positive integer greater than 1.

The terminal device 100 may implement the photographing function by using the ISP, the camera 193, the video codec, the GPU, the display 194, the application processor, and the like.

The ISP is configured to process data fed back by the camera 193. For example, during photographing, a shutter is opened, a light ray is transferred to the camera's photosensitive element through a lens, an optical signal is converted into an electrical signal, and the cameras photosensitive element transfers the electrical signal to the ISP for processing and conversion into an image visible by naked eyes. The ISP may further perform algorithm optimization on noise, brightness, and a skin tone of the image. The ISP may further optimize parameters such as exposure and a color temperature of a photographed scene. In some embodiments, the ISP may be disposed in the camera 193.

The digital signal processor is configured to process digital signals, and may process other digital signals in addition to digital image signals. For example, when the terminal device 100 selects a frequency, the digital signal processor is configured to perform Fourier Transform on frequency energy.

The video codec is configured to compress or decompress a digital video. The terminal device 100 may support one or more types of video codecs. In this way, the terminal device 100 may play or record videos in a plurality of coding formats, for example, Moving Picture Experts Group (moving picture experts group, MPEG) 1, MPEG2, MPEG3, MPEG4, and the like.

The NPU is a neural-network (neural-network, NN) computing processor, and by using a biological neural network structure as reference, for example, by using a transmission mode between human brain neurons as reference, the NPU quickly processes input information, and may further perform continuous self-learning. The NPU may be used to implement intelligent cognition of the terminal device 100 and other applications, for example, image recognition, facial recognition, speech recognition, and text understanding.

The external memory interface 120 may be configured to connect to an external storage card, for example, a micro SD card, to extend a storage capability of the terminal device 100. The external storage card communicates with the processor 110 by using the external memory interface 120, to implement a data storage function, for example, to store music, video, and other files in the external storage card.

The internal memory 121 may be configured to store computer executable program code, where the executable program code includes instructions. The internal memory 121 may include a program storage area and a data storage area. The program storage area may store an operating system, an application program required by at least one function (for example, a sound playing function or an image playing function), and the like. The data storage area may store data (for example, audio data or a phone book) created in a process of using the terminal device 100. In addition, the internal memory 121 may include a high-speed random access memory, and may further include a non-volatile memory, for example, at least one magnetic disk storage device, a flash memory device, a universal flash storage (universal flash storage, UFS), or the like. The processor 110 executes various function applications and data processing of the terminal device 100 by running the instructions stored in the internal memory 121 and/or the instructions stored in the memory disposed in the processor.

The terminal device 100 may use the audio module 170, the speaker 170A, the telephone receiver 170B, the microphone 170C, the headset jack 170D, the application processor, and the like to implement an audio function for example, music playback or recording.

The audio module 170 is configured to convert digital audio information into an analog audio signal for output, and may also be configured to convert analog audio input into a digital audio signal. The audio module 170 may further be configured to encode and decode audio signals. In some embodiments, the audio module 170 may be disposed in the processor 110, or some functional modules of the audio module 170 may be disposed in the processor 110.

An embodiment of this application provides a storage medium. The storage medium is configured to store a computer program. When executed by a computer or a processor, the computer program is configured to implement the foregoing image processing method.

An embodiment of this application provides a computer program product. The computer program product includes instructions, and when the instructions are executed, a computer is enabled to perform the foregoing image processing method.

An embodiment of this application provides a system on chip or a system chip. The system on chip or the system chip may be applied to a terminal device, and the system on chip or the system chip includes at least one communications interface, at least one processor, and at least one memory. The communications interface, the memory and the processor are interconnected by using a bus, and the processor executes instructions stored in the memory, so that the terminal device can perform the foregoing image processing method.

All or some of the steps of the method embodiments may be implemented by a program instructing relevant hardware. The foregoing program may be stored in a computer-readable memory. When the program is executed, the steps of the methods in the embodiments are performed. The memory (storage medium) includes: a read-only memory (read-only memory, ROM), a RAM, a flash memory, a hard disk, a solid state disk, a magnetic tape (magnetic tape), a floppy disk (floppy disk), an optical disc (optical disc), and any combination thereof.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processing unit of any other programmable data processing device to generate a machine, so that the instructions executed by a computer or a processing unit of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to embodiments of this application without departing from the spirit and scope of this application. In this way, this application is intended to cover these modifications and variations provided that they fall within the protection of the claims of this application and their equivalent technologies.

In this application, the term "including" and variations thereof may refer to a non-limiting inclusion; and the term "or" and variants thereof may refer to "and/or". In this application, the terms "first", "second", and so on are intended to distinguish between similar objects but do not necessarily indicate a specific order or sequence. "A plurality of" in this application refers to two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

What is claimed is:

1. An image processing method, comprising:
    displaying a first image having a first size and comprising salient content corresponding to a representation of a salient object in the first image;
    receiving an operation of a user, wherein the operation of the user is a profile picture setting operation, a screen setting operation, a picture sharing operation, a contact list operation, or a picture sending operation;
    determining, responsive to the operation, the representation of the salient object and a second circular region that is in the first image and that comprises the representation of the salient object, wherein a second diameter of the second circular region is greater than a first diameter of a first circular region, wherein the second diameter is less than or equal to a shortest side length of the first image, and wherein the first circular region is a smallest circular region comprising the representation of the salient object;
    cropping the first image based on the second circular region to obtain a second image having a second size and comprising the salient content, wherein the second size is smaller than the first size; and
    displaying the second image.

2. The image processing method of claim 1, further comprising:
    obtaining a first ratio of the first diameter to the shortest side length;
    determining the second circular region based on a preset ratio of the second diameter to the first diameter when the first ratio is between a first threshold and a second threshold; and
    when the first ratio is less than the first threshold or greater than the second threshold:
        determining a square region in the first image, wherein the square region comprises the representation of the salient object, and wherein a side length of the square region is equal to the shortest side length; and
        determining an inscribed circle region of the square region as the second circular region.

3. The image processing method of claim 2, further comprising:
    determining the first circular region in the first image; and
    determining the second circular region based on a circle center of the first circular region, a center of the first image, the first diameter, and the preset ratio.

4. The image processing method of claim 3, further comprising:
    determining an initial circle center in the first image based on the circle center of the first circular region and the center of the first image, wherein the circle center of the first circular region, the center of the first image, and the initial circle center are located on one straight line;
    determining the second diameter based on the first diameter and the preset ratio; and
    determining the second circular region based on the initial circle center and the second diameter.

5. The image processing method of claim 4, further comprising:
    determining a third circular region using the initial circle center as a circle center of the third circular region and the second diameter as a diameter of the third circular region, wherein the first circular region is internally tangent to the third circular region;
    determining whether the third circular region has a part outside the first image;
    determining the third circular region as the second circular region when the third circular region has no part outside the first image; and
    when the third circular region has the part outside the first image:
        performing a translation operation on the third circular region, a rotation operation on the third circular region, or both the translation operation and the rotation operation, to generate a processed third circular region until the processed third circular region is entirely located in the first image; and determining the processed third circular region as the second circular region.

6. The image processing method of claim 2, further comprising:

determining a rectangular region in the first image, wherein the rectangular region is a smallest rectangular region that comprises the representation of the salient object; and determining the square region in the first image based on a size of the rectangular region and the side length of the square region.

7. The image processing method of claim 6, further comprising:

determining, based on the size of the rectangular region and the side length of the square region, whether the square region is capable of totally covering the rectangular region;

determining the square region based on the rectangular region when the square region is incapable of totally covering the rectangular region, wherein the square region is located at a middle location of the rectangular region; and when the square region is capable of totally covering the rectangular region:
obtaining a location of a center of gravity of the first image and a center of gravity of the representation of the salient object; and
determining the square region based on the location of the center of gravity of the first image and the center of gravity of the salient object.

8. The image processing method of claim 7, further comprising:

determining the center of gravity of the first image;

obtaining a first distance between the center of gravity of the first image and a center of the first image, a second distance between the center of gravity of the first image and a first trisector line of a plurality of trisector lines of the first image, and a third distance between the center of gravity of the first image and a first edge of a plurality of edges of the first image, wherein the distance between the center of gravity of the first image and the first trisector line is shorter than respective distances between the center of gravity of the first image and each other trisector line of the plurality of trisector lines, and wherein the distance between the center of gravity of the first image and the first edge is shorter than respective distances between the center of gravity of the first image and each other edge of the plurality of edges; and determining the location of the center of gravity of the first image based on the first distance, the second distance, and the third distance, wherein the location of the center of gravity of the first image is at least one of a location proximate to the center of the first image, a location proximate to at least one trisector line of the plurality of trisector lines, or a location proximate to at least one edge of the plurality of edges.

9. The image processing method of claim 8, further comprising:

determining, when the first distance is less than the second distance and the third distance, that the location of the center of gravity of the first image is the location proximate to the center of the first image;

determining, when the second distance is less than the first distance and the third distance, that the location of the center of gravity of the first image is the location proximate to the at least one trisector line; and determining, when the third distance is less than the first distance and the second distance, that the location of the center of gravity of the first image is the location proximate to the at least one edge.

10. The image processing method of claim 8, further comprising:

determining, when the location of the center of gravity of the first image is the location proximate to the center of the first image, the square region based on the center of gravity of the representation of the salient object and a center of the square region, wherein the center of gravity of the representation of the salient object is located at a central location of the square region; or determining, when the location of the center of gravity of the first image is the location proximate to the at least one trisector line, the square region based on the center of gravity of the representation of the salient object and a second trisector line of the square region, wherein the center of gravity of the representation of the salient object is located on the second trisector line, wherein the first trisector line and the second trisector line are both upper trisector lines, lower trisector lines, left trisector lines, or right trisector lines; or determining, when the location of the center of gravity of the first image is the location proximate to the at least one edge, the square region based on the center of gravity of the representation of the salient object and a second edge of the square region, wherein a distance between the center of gravity of the representation of the salient object and the second edge is less than a preset distance, and wherein the second edge and the first edge are both upper edges, lower edges, left edges, or right edges.

11. An image processing apparatus, comprising:

a memory configured to store program instructions; and a processor coupled to the memory and configured to execute the program instructions to cause the image processing apparatus to:

display a first image having a first size and comprising salient content corresponding to a representation of a salient object in the first image;

receive an operation of a user, wherein the operation of the user is a profile picture setting operation, a screen setting operation, a picture sharing operation, a contact list operation, or a picture sending operation;

determine, responsive to the operation, the representation of the salient object and a second circular region that is in the first image and that comprises the representation of the salient object, wherein a second diameter of the second circular region is greater than a first diameter of a first circular region, wherein the second diameter is less than or equal to a shortest side length of the first image, and wherein the first circular region is a smallest circular region comprising the representation of the salient object;

crop the first image based on the second circular region to obtain a second image having a second size and comprising the salient content, wherein the second size is smaller than the first size; and display the second image.

12. The image processing apparatus of claim 11, wherein when executed by the processor, the program instructions further cause the image processing apparatus to:

obtain a first ratio of the first diameter to the shortest side length of the first image;
determine the second circular region based on a preset ratio of the second diameter to the first diameter when the first ratio is between a first threshold and a second threshold; and
when the first ratio is less than the first threshold or greater than the second threshold:
determine a square region in the first image, wherein the square region comprises the representation of the salient object, and wherein a side length of the square region is equal to the shortest side length; and
determine an inscribed circle region of the square region as the second circular region.

13. The image processing apparatus of claim 12, wherein when executed by the processor, the program instructions further cause the image processing apparatus to:
determine the first circular region in the first image; and
determine the second circular region in the first image based on a circle center of the first circular region, a center of the first image, the first diameter, and the preset ratio.

14. The image processing apparatus of claim 13, wherein when executed by the processor, the program instructions further cause the image processing apparatus to:
determine an initial circle center in the first image based on the circle center of the first circular region and the center of the first image, wherein the circle center of the first circular region, the center of the first image, and the initial circle center are located on one straight line;
determine the second diameter based on the first diameter and the preset ratio; and
determine the second circular region based on the initial circle center and the second diameter.

15. The image processing apparatus of claim 14, wherein when executed by the processor, the program instructions further cause the image processing apparatus to:
determine a third circular region using the initial circle center as a circle center of the third circular region and the second diameter as a diameter of the third circular region, wherein the first circular region is internally tangent to the third circular region;
determine whether the third circular region has a part outside the first image;
determine, when the third circular region has no part outside the first image, the third circular region as the second circular region; and
when the third circular region has the part outside the first image:
perform a translation operation on the third circular region, a rotation operation on the third circular region, or both the translation operation and the rotation operation, to generate a processed third circular region until the processed third circular region is entirely located in the first image; and
determine the processed third circular region as the second circular region.

16. The image processing apparatus of claim 12, wherein when executed by the processor, the program instructions further cause the image processing apparatus to:
determine a rectangular region in the first image, wherein the rectangular region is a smallest rectangular region that comprises the representation of the salient object; and
determine the square region based on a size of the rectangular region and the side length of the square region.

17. The image processing apparatus of claim 16, wherein when executed by the processor, the program instructions further cause the image processing apparatus to:
determine, based on the size of the rectangular region and the side length of the square region, whether the square region is capable of totally covering the rectangular region;
determine, when the square region is incapable of totally covering the rectangular region, the square region based on the rectangular region, wherein the square region is located at a middle location of the rectangular region; and
when the square region is capable of totally covering the rectangular region:
obtain a location of a center of gravity of the first image and a center of gravity of the representation of the salient object; and
determine the square region based on the location of the center of gravity of the first image and the center of gravity of the representation of the salient object.

18. The image processing apparatus of claim 17, wherein when executed by the processor, the program instructions further cause the image processing apparatus to:
determine the center of gravity of the first image;
obtain a first distance between the center of gravity of the first image and a center of the first image, a second distance between the center of gravity of the first image and a first trisector line of a plurality of trisector lines of the first image, and a third distance between the center of gravity of the first image and a first edge of a plurality of edges of the first image, wherein the distance between the center of gravity of the first image and the first trisector line is shorter than respective distances between the center of gravity of the first image and each other trisector line of the plurality of trisector lines, and wherein the distance between the center of gravity of the first image and the first edge is shorter than respective distances between the center of gravity of the first image and each other edge of the plurality of edges; and
determine the location of the center of gravity of the first image based on the first distance, the second distance, and the third distance, wherein the location of the center of gravity of the first image is at least one of a location proximate to the center of the first image, a location proximate to at least one trisector line of the plurality of trisector lines, or a location proximate to at least one edge of the plurality of edges.

19. The image processing apparatus of claim 18, wherein when executed by the processor, the program instructions further cause the image processing apparatus to:
determine, when the first distance is less than the second distance and the third distance, that the location of the center of gravity of the first image is the location proximate to the center of the first image;
determine, when the second distance is less than the first distance and the third distance, that the location of the center of gravity of the first image is the location proximate to the at least one trisector line; and
determine, when the third distance is less than the first distance and the second distance, that the location of the center of gravity of the first image is the location proximate to the at least one edge.

20. The image processing apparatus of claim 18, wherein when executed by the processor, the program instructions further cause the image processing method to:

determine, if the location of the center of gravity of the first image is the location proximate to the center of the first image, the square region based on the center of gravity of the representation of the salient object and a center of the square region, wherein the center of gravity of the representation of the salient object is located at a central location of the square region; or determine, when the location of the center of gravity of the first image is the location proximate to the at least one trisector line, the square region based on the center of gravity of the representation of the salient object and a second trisector line of the square region, wherein the center of gravity of the representation of the salient object is located on the second trisector line, and wherein the first trisector line and the second trisector line are both upper trisector lines, lower trisector lines, left trisector lines, or right trisector lines; or determine, when the location of the center of gravity of the first image is the location proximate to the at least one edge, the square region based on the center of gravity of the representation of the salient object and a second edge of the square region, wherein a distance between the center of gravity of the representation of the salient object and the second edge is less than a preset distance, and wherein the second edge and the first edge are both upper edges, lower edges, left edges, or right edges.

21. The image processing apparatus of claim 11, wherein when executed by the processor, the program instructions further cause the image processing apparatus to determine the representation of the salient object by performing at least one of saliency detection processing, semantic segmentation processing, or line detection processing on the first image.

* * * * *